(12) United States Patent   (10) Patent No.: US 8,711,262 B2
Nakano et al.   (45) Date of Patent: Apr. 29, 2014

(54) SOLID-STATE IMAGE SENSING DEVICE AND CONTROL METHOD OF SOLID-STATE IMAGE SENSING DEVICE

(75) Inventors: Teppei Nakano, Yokohama (JP); Motohiro Morisaki, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1122 days.

(21) Appl. No.: 12/699,288

(22) Filed: Feb. 3, 2010

(65) Prior Publication Data

US 2010/0201858 A1   Aug. 12, 2010

(30) Foreign Application Priority Data

Feb. 6, 2009   (JP) .................................. 2009-026283

(51) Int. Cl.
*H04N 3/14*   (2006.01)

(52) U.S. Cl.
USPC .......................................... 348/308; 348/319

(58) Field of Classification Search
USPC .................. 348/294, 296, 302, 308, 316, 319; 250/208.1; 257/291, 292, 294, 440, 257/443–448
See application file for complete search history.

(56) References Cited

U.S. PATENT DOCUMENTS

| 6,507,365 B1 * | 1/2003 | Nakamura et al. | 348/296 |
| 7,321,329 B2 * | 1/2008 | Tooyama et al. | 341/163 |
| 8,451,355 B2 * | 5/2013 | Makino | 348/296 |
| 2005/0104985 A1 * | 5/2005 | Abe et al. | 348/308 |

FOREIGN PATENT DOCUMENTS

| JP | 2000-224492 A | 8/2000 |
| JP | 2000-350103 A | 12/2000 |
| JP | 2005-184358 | 7/2005 |
| JP | 2006-74367 A | 3/2006 |
| JP | 2007-173950 | 7/2007 |
| JP | 2008-172608 | 7/2008 |
| JP | 2008-172704 A | 7/2008 |

OTHER PUBLICATIONS

Office Action issued Dec. 16, 2011 in China Application No. 201010113650.9.
Japanese Office Action issued Dec. 11, 2012 in Patent Application No. 2009-026283 with English Translation.
U.S. Appl. No. 13/419,638, filed Mar. 14, 2012, Mihara, et al.

* cited by examiner

*Primary Examiner* — Twyler Haskins
*Assistant Examiner* — Akshay Trehan
(74) *Attorney, Agent, or Firm* — Oblon, Spivak, McClelland, Maier & Neustadt, L.L.P.

(57) ABSTRACT

A solid-state image sensing device includes an image sensing region having pixels arranged in a two-dimensional array. A vertical shift register circuit selects a desired pixel row of the pixels by changing the number of one or more clock signals supplied and timing thereof in one horizontal period. A pulse selector circuit supplies a drive pulse to the desired pixel row selected by the vertical shift register circuit.

8 Claims, 23 Drawing Sheets

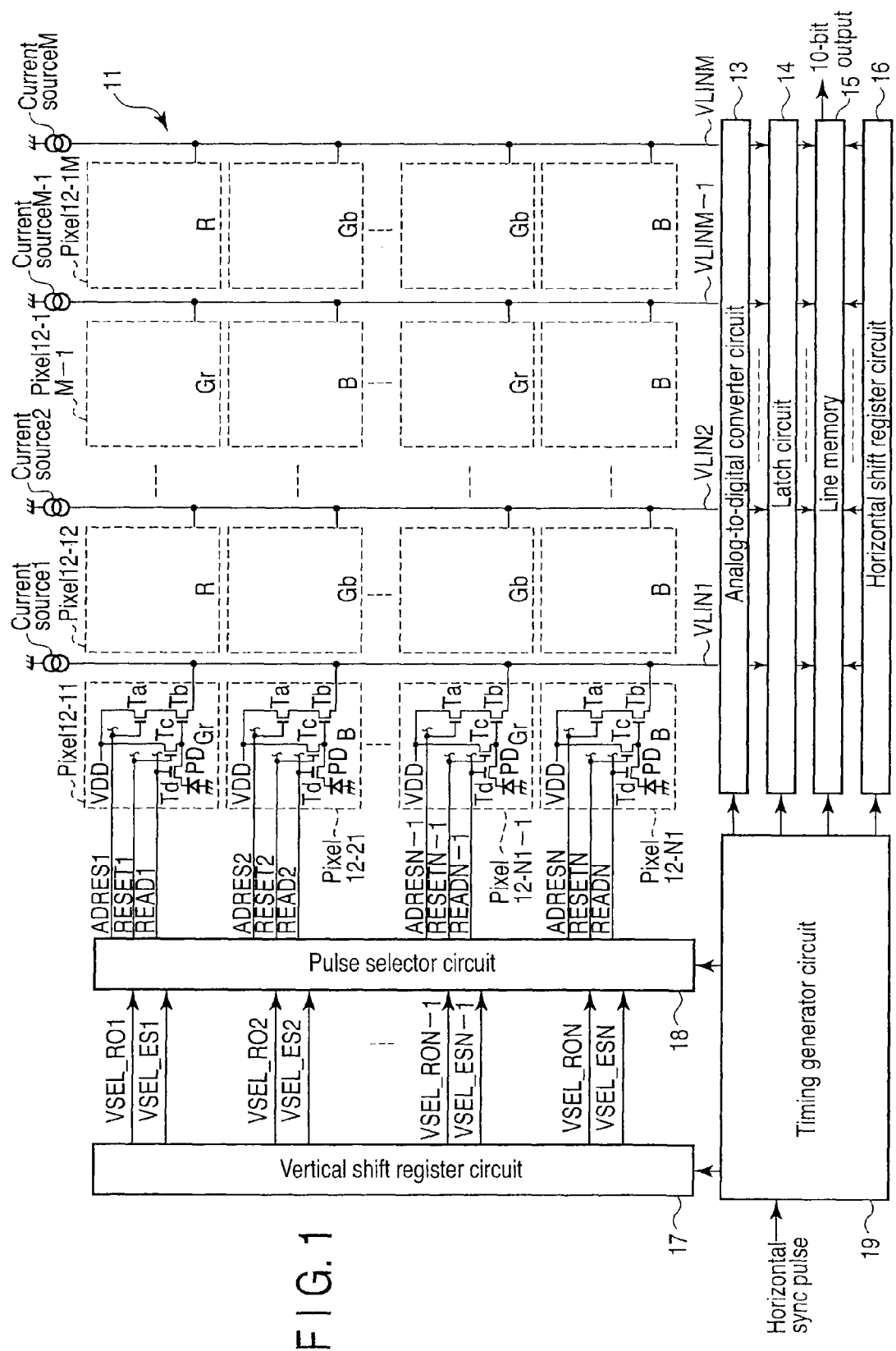
F I G. 1

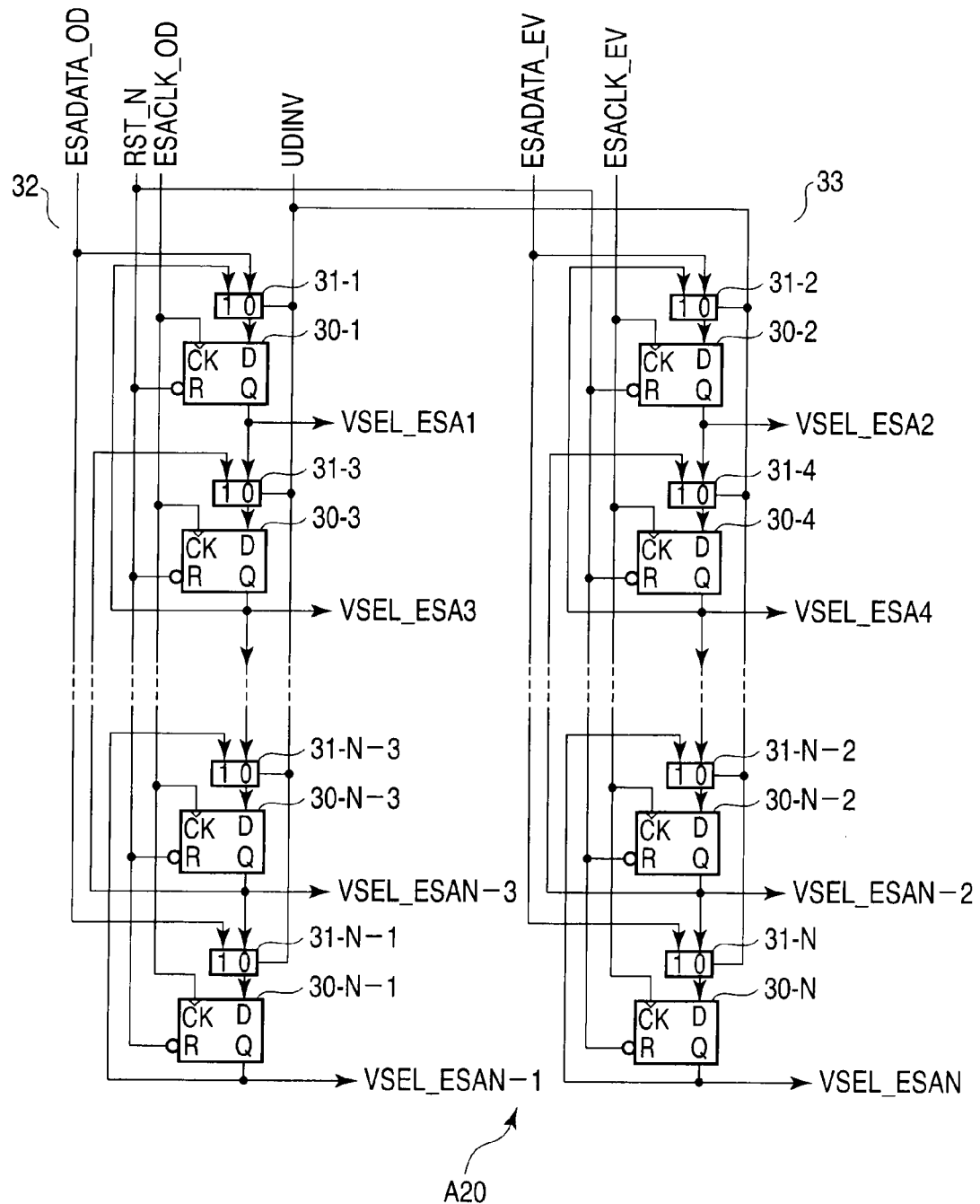
F I G. 3

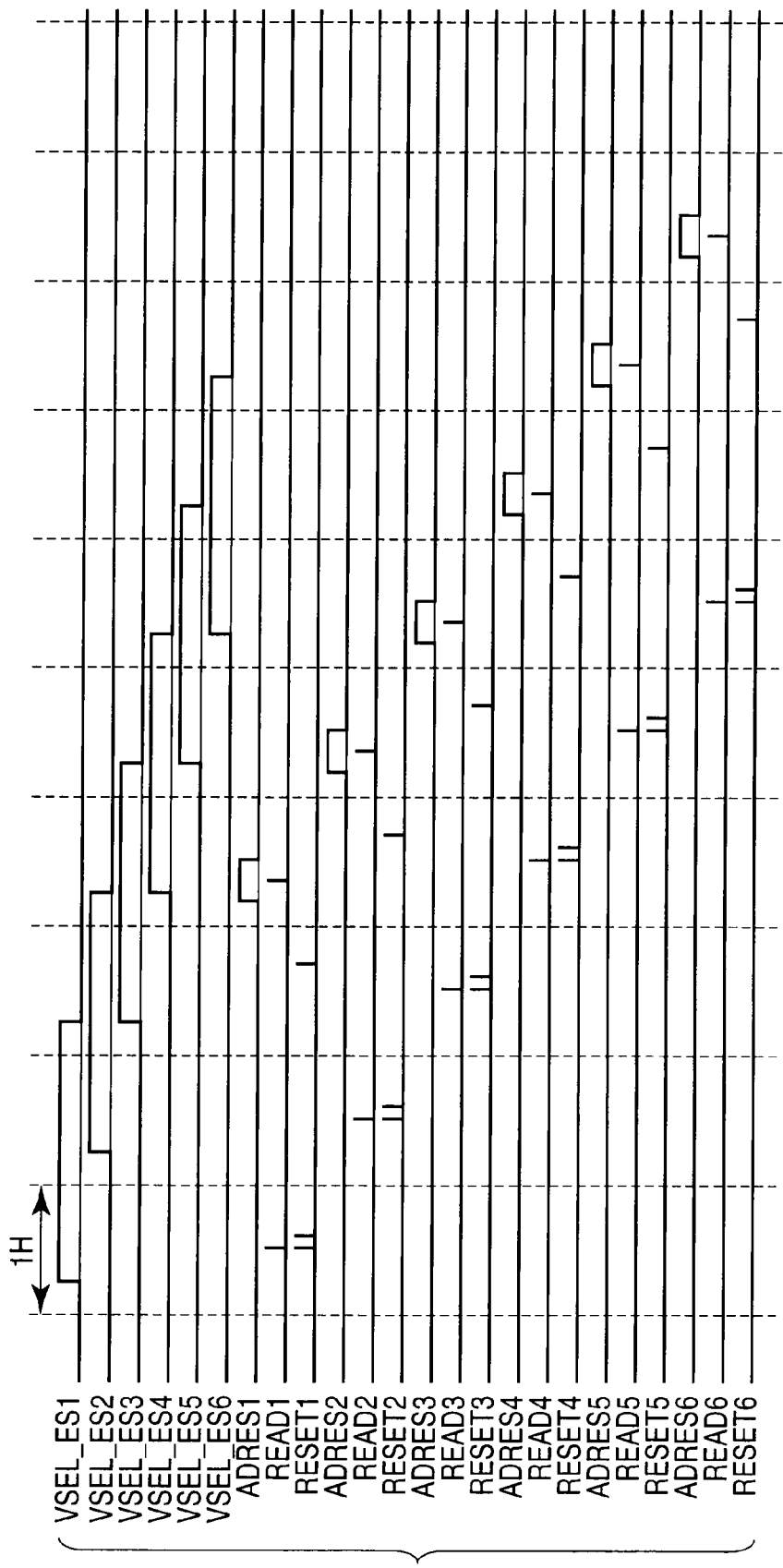
F I G. 7B

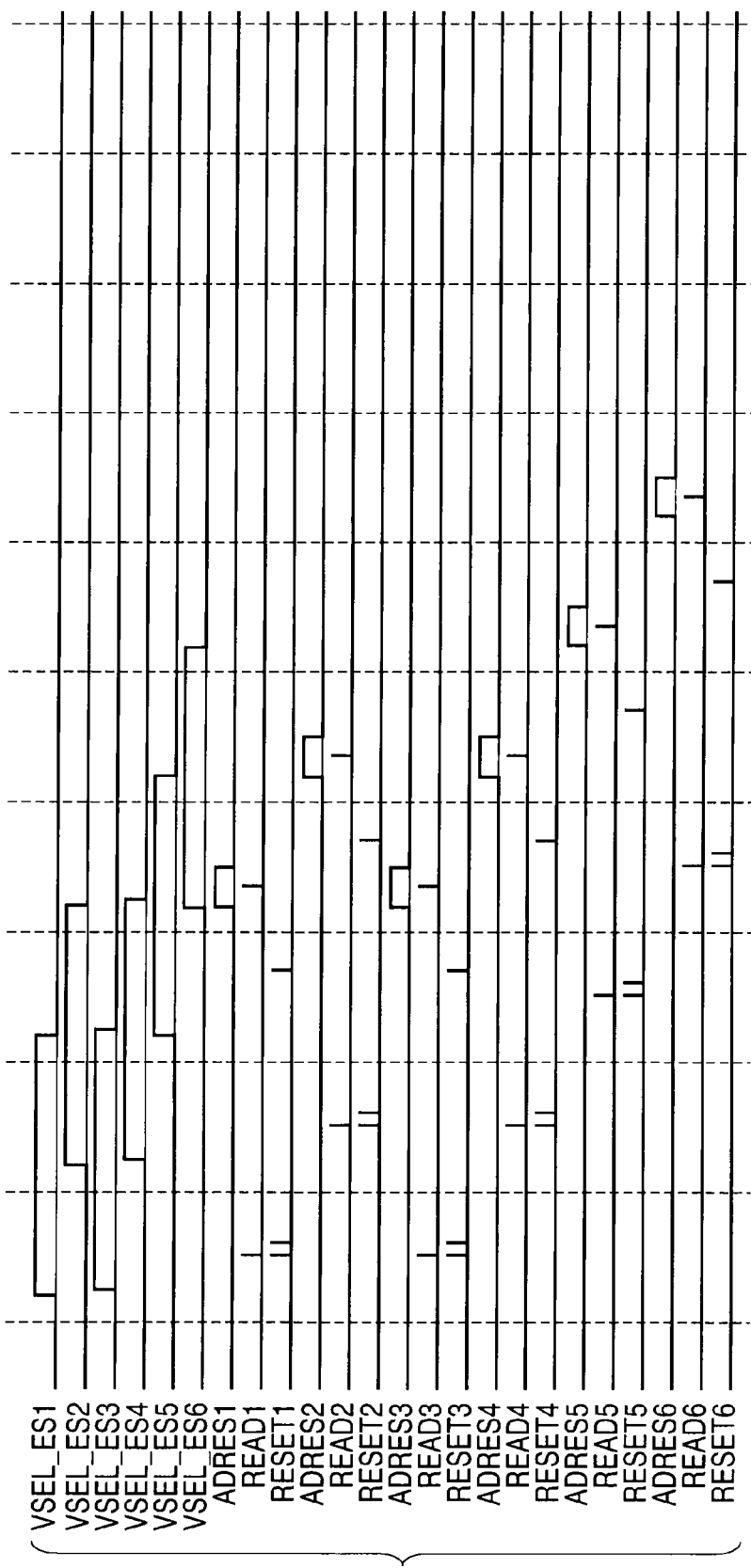
F I G. 10B

Figures 11C, 11D:
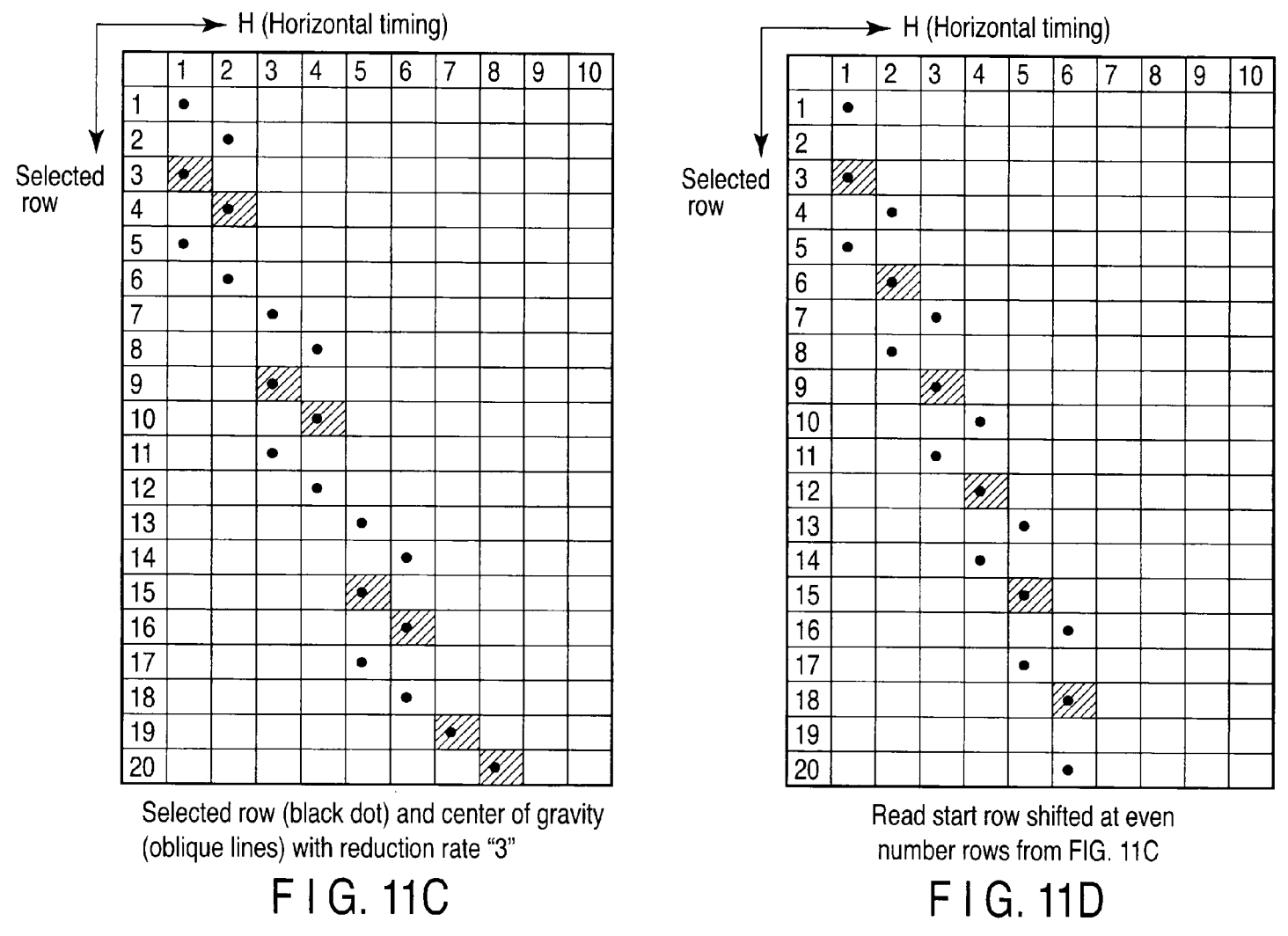

FIG. 11C Selected row (black dot) and center of gravity (oblique lines) with reduction rate "3"

FIG. 11D Read start row shifted at even number rows from FIG. 11C

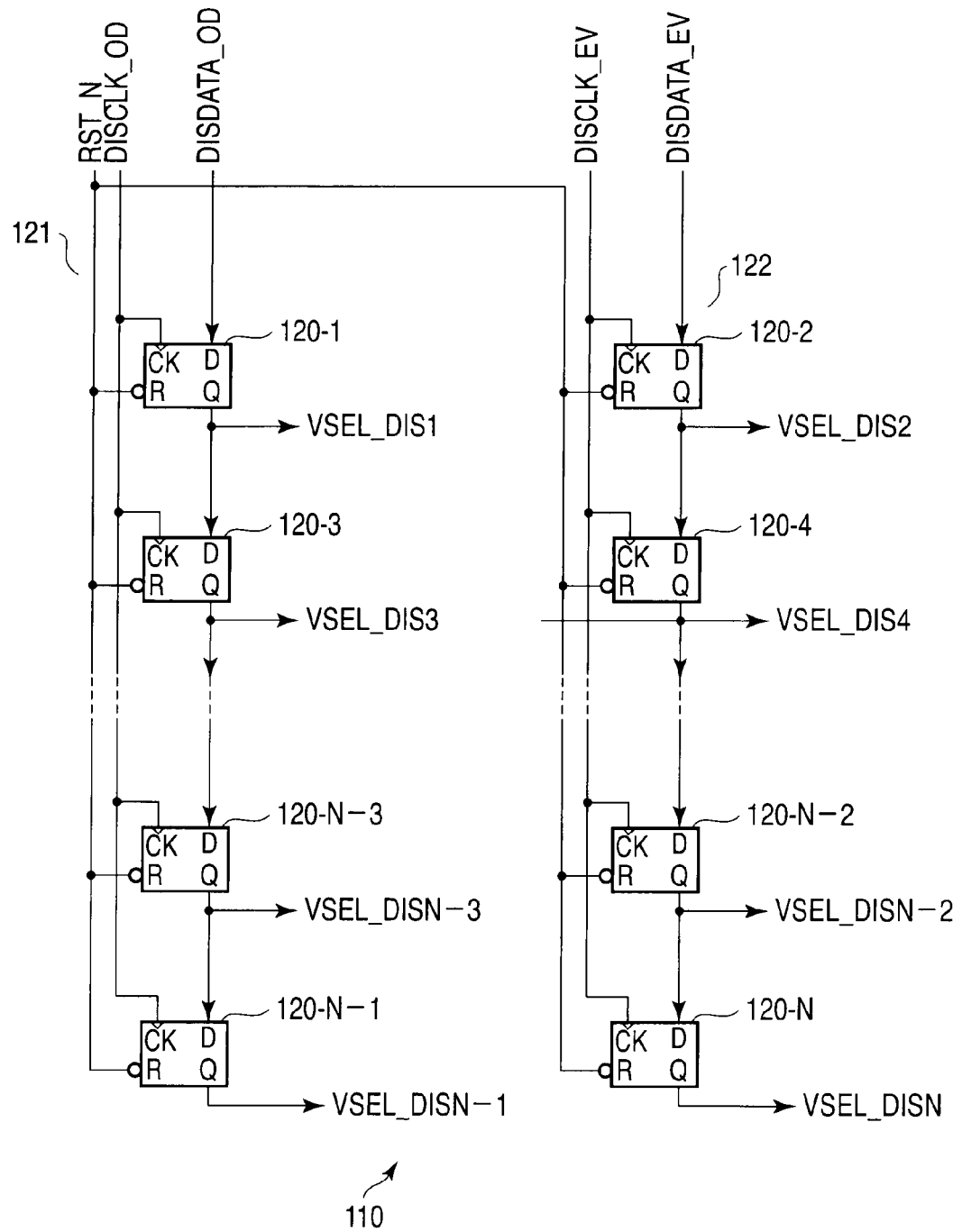
F I G. 14

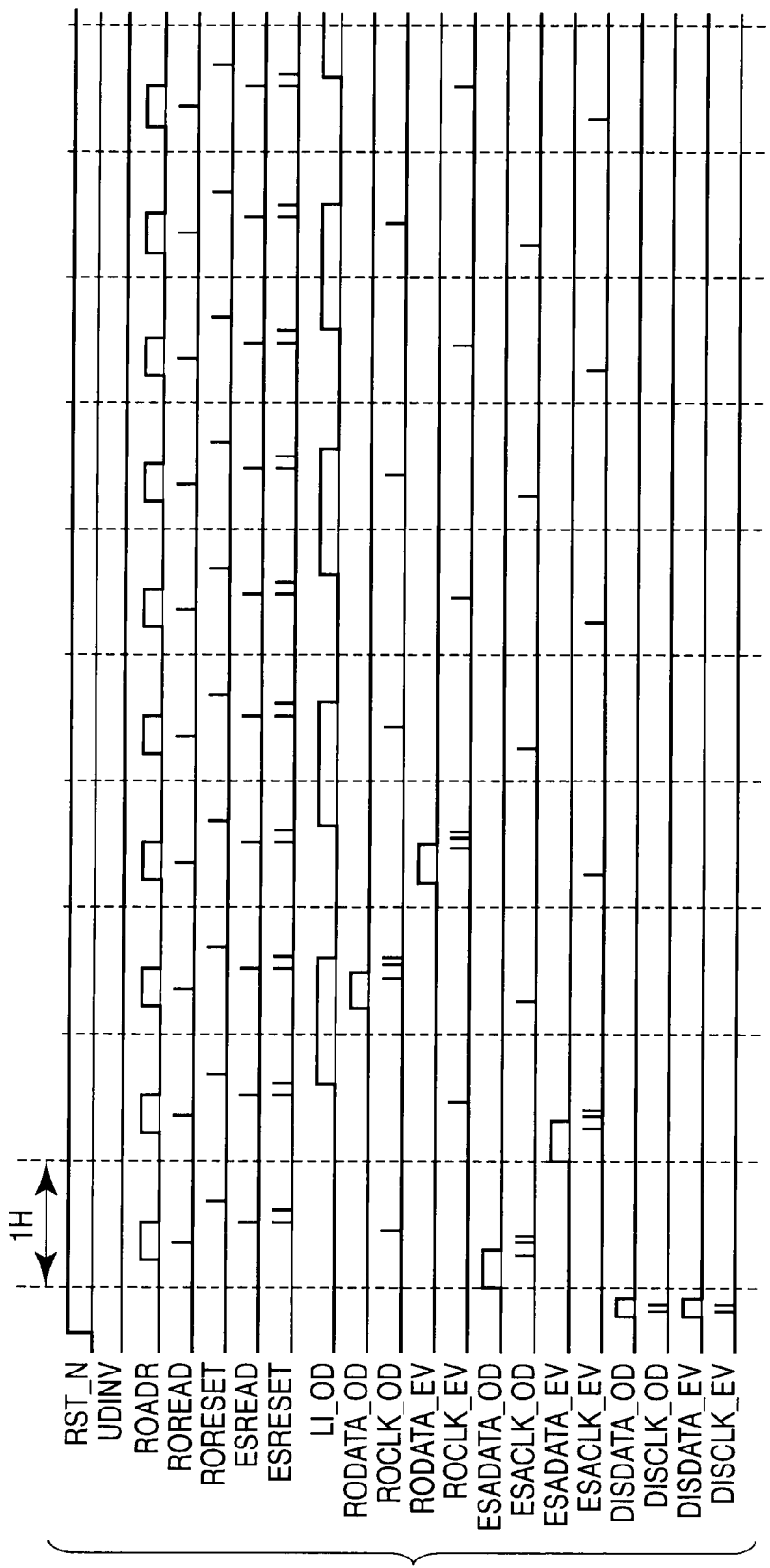
F I G. 15A

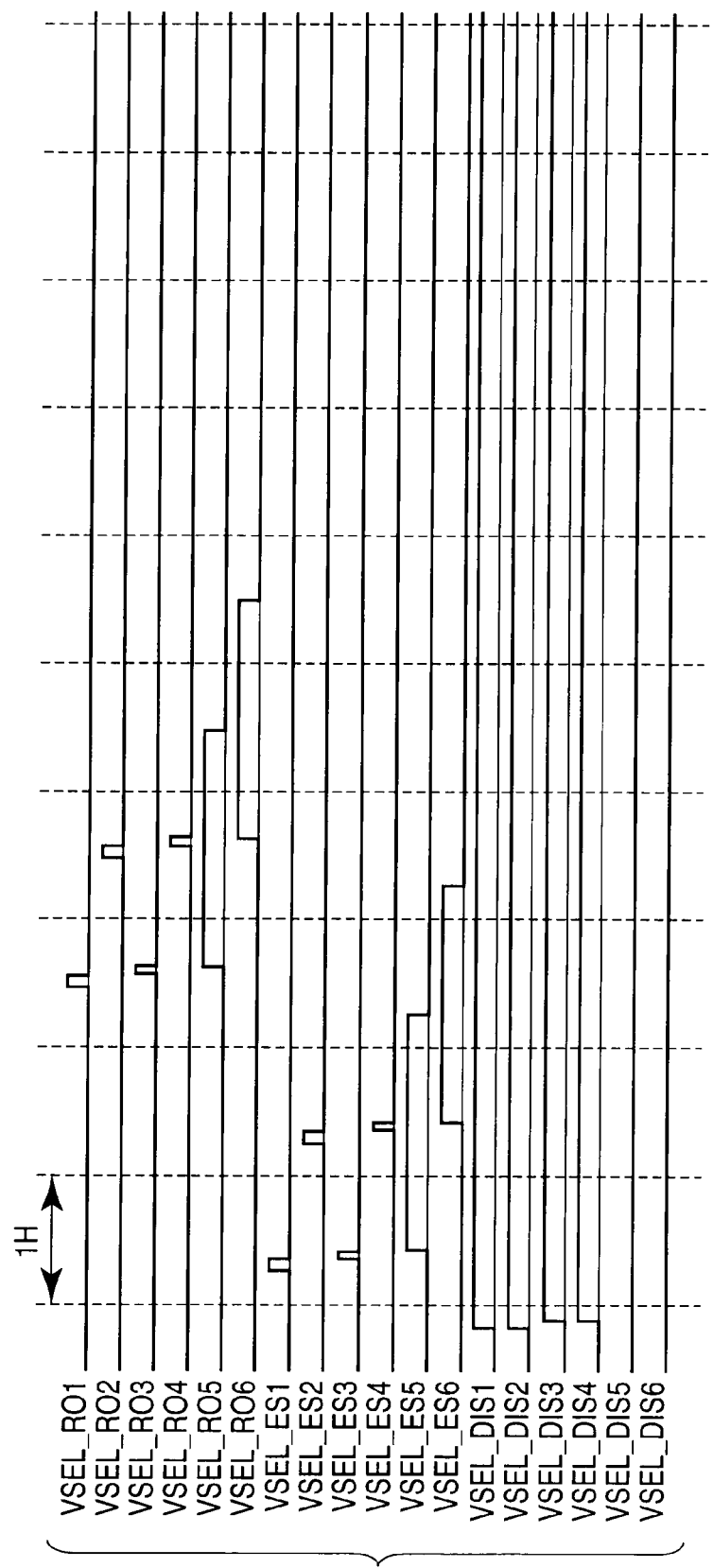
F I G. 15B

SOLID-STATE IMAGE SENSING DEVICE AND CONTROL METHOD OF SOLID-STATE IMAGE SENSING DEVICE

CROSS-REFERENCE TO RELATED APPLICATIONS

This application is based upon and claims the benefit of priority from prior Japanese Patent Application No. 2009-026283, filed Feb. 6, 2009, the entire contents of which are incorporated herein by reference.

BACKGROUND OF THE INVENTION

1. Field of the Invention

This invention relates to a solid-state image sensing device and, for example, a CMOS image sensor comprising a vertical shift register that realizes "sub-sampling", "averaging" of pixels (signal charges) in a vertical direction of an image sensing region or "cutting out" of pixels in a desired range.

2. Description of the Related Art

A CMOS image sensor is used in a portable telephone with an image sensor, digital camera or video camera. Recent CMOS image sensors have 5,000,000 or more pixels. In a still image photographing operation, photographed images (video signal) with high resolution can be attained by reading all of the pixels. However, the frame rate in the "whole pixel reading operation", for example, the frame rate in the read operation of whole 5,000,000 pixels is approximately 15 frames/sec. The value is not sufficiently large as the rate of a "viewfinder mode" in a digital still camera or "motion image photographing mode" in a video camera in which a high frame rate is required, for example.

As a method for enhancing the frame rate, a method for compressing photographed images is generally known (for example, see Jpn. Pat. Appln. KOKAI Publication No. 2008-172608). The operation of compressing photographed images is generally performed by "sub-sampling". With the method, the photographed image is compressed by not reading some pixels in row and column directions of the image sensing region of the CMOS image sensor. The resolution is lowered by "sub-sampling", but a sufficiently high frame rate can be attained by "motion image photographing". However, in a simple "sub-sampling" process in a single-plate image sensor, since the distance between pixels becomes larger, false color occurs and the image quality is degraded.

As the measure against the degradation in the image quality due to occurrence of false color, a method of "pixel averaging" is known (for example, see Jpn. Pat. Appln. KOKAI Publication No. 2007-173950). Like the "sub-sampling" method, the above method is a method for compressing photographed images, but a method for averaging luminance values of a plurality of pixels in a vertical or horizontal direction containing sub-sampled pixels without casting the sub-sampled pixels unlike the "sub-sampling" method. Since the luminance values of the sub-sampled pixels are also reflected, false color is difficult to occur.

Further, it is important that the CMOS image sensor satisfies a video signal standard of a Standard Definition (SD) system or High Definition TV (HDTV) system. This is because it becomes disadvantageous in cost and structure if image sensors having specifications corresponding to the respective systems are mounted on a camera, and therefore, it becomes necessary to switch and use one of the sensors. In order to cope with the plural specifications, a method for arranging pixels to satisfy the respective video signal standards (systems) and adjusting the size of a photographed image by "cutting out" is considered (for example, see Jpn. Pat. Appln. KOKAI Publication No. 2005-184358).

However, in the prior art technique, it is necessary to provide extra logic gates in drive circuits of respective rows for the countermeasure against blooming of pixels that are sub-sampled and are not read in the case of Jpn. Pat. Appln. KOKAI Publication No. 2008-172608 in which a "sub-sampling" process is realized. Therefore, the technique is disadvantageous in a circuit area.

In Jpn. Pat. Appln. KOKAI Publication No. 2007-173950 in which "pixel averaging" is proposed, pixels are averaged by means of resistors by using the output impedance of a source-follower circuit. Therefore, it is not necessary to additionally provide circuit elements such as capacitors and "pixel averaging" can be attained by means of a small-scale circuit. However, in Jpn. Pat. Appln. KOKAI Publication No. 2007-173950, the image sensing region is divided into blocks of every four rows and the number of to-be-averaged pixels is changed according to four select signals supplied to each block. Therefore, the degree of freedom is suppressed and, for example, the combination of to-be-averaged pixels is limited within the block or the select circuit is made larger in proportion to the number of pixels in order to increase the number of to-be-averaged pixels.

In Jpn. Pat. Appln. KOKAI Publication No. 2005-184358 in which "cutting out" is proposed, there is provided a logic gate that supplies a control pulse for discharging signal charges to a row that is not read at the "cutting out" time. Therefore, when it becomes necessary to cope with different video signal standards, logic gates are required for respective standards and the circuit area increases accordingly.

BRIEF SUMMARY OF THE INVENTION

According to one aspect of the invention, there is provided a solid-state image sensing device comprising: an image sensing region having pixels arranged in a two-dimensional array, a vertical shift register circuit that selects a desired pixel row of the pixels by changing the number of one or more clock signals supplied and timing thereof in one horizontal period, and a pulse selector circuit that supplies a drive pulse to the desired pixel row selected by the vertical shift register circuit.

According to another aspect of the invention, there is provided a solid-state image sensing device comprising: an image sensing region having pixels arranged in a two-dimensional array, the pixels configuring pixel rows; a timing generator circuit that outputs one or more drive pulses to drive the pixels at common timing for each unit period and outputs one or more clock signals at common timing for each unit period, the timing generator circuit being configured to output the one or more clock signals of a variable number and timing in the unit period; a vertical shift register circuit that outputs a row select signal to select one of pixel rows determined by the number and timing of the one or more clock signals; and a pulse selector circuit that supplies the one or more drive pulses to the pixel row specified by the row select signal.

According to still another aspect of the invention, there is provided a control method for a solid-state image sensing device including an image sensing region having pixels arranged in a two-dimensional array, the pixels configuring pixel rows, the method comprising: outputting one or more drive pulses to drive the pixels at common timing for each unit period; outputting one or more clock signals at common timing for each unit period through a timing generator circuit, the timing generator circuit being configured to output the one or more clock signals of a variable number and timing in the unit period, outputting a row select signal to select a pixel row determined by the number and timing of the one or more clock signals, and supplying the one or more drive pulses to a pixel row of the pixels specified by the row select signal.

BRIEF DESCRIPTION OF THE SEVERAL VIEWS OF THE DRAWING

FIG. 1 is a block diagram showing a design example of a solid-state image sensing device (CMOS image sensor) according to an embodiment 1 of this invention.

FIG. 3 shows the design of an electronic shutter vertical shift register circuit (A20) of the vertical shift register circuit of FIG. 2.

FIG. 7A and FIG. 7B are timing charts for illustrating sensor operation timing (for the standard operation).

FIG. 10A and FIG. 10B are timing charts for illustrating sensor operation timing (for the pixel averaging).

FIGS. 11A, 11B, 11C, 11D are diagrams for illustrating read methods with which false color is more difficult to occur.

FIG. 14 shows the design of a discharging vertical shift register circuit of the vertical shift register circuit of FIG. 13.

FIG. 15A, FIG. 15B and FIG. 15C are timing charts for illustrating sensor operation timing (at the cutting-out process time).

DETAILED DESCRIPTION OF THE INVENTION

Figure 2:
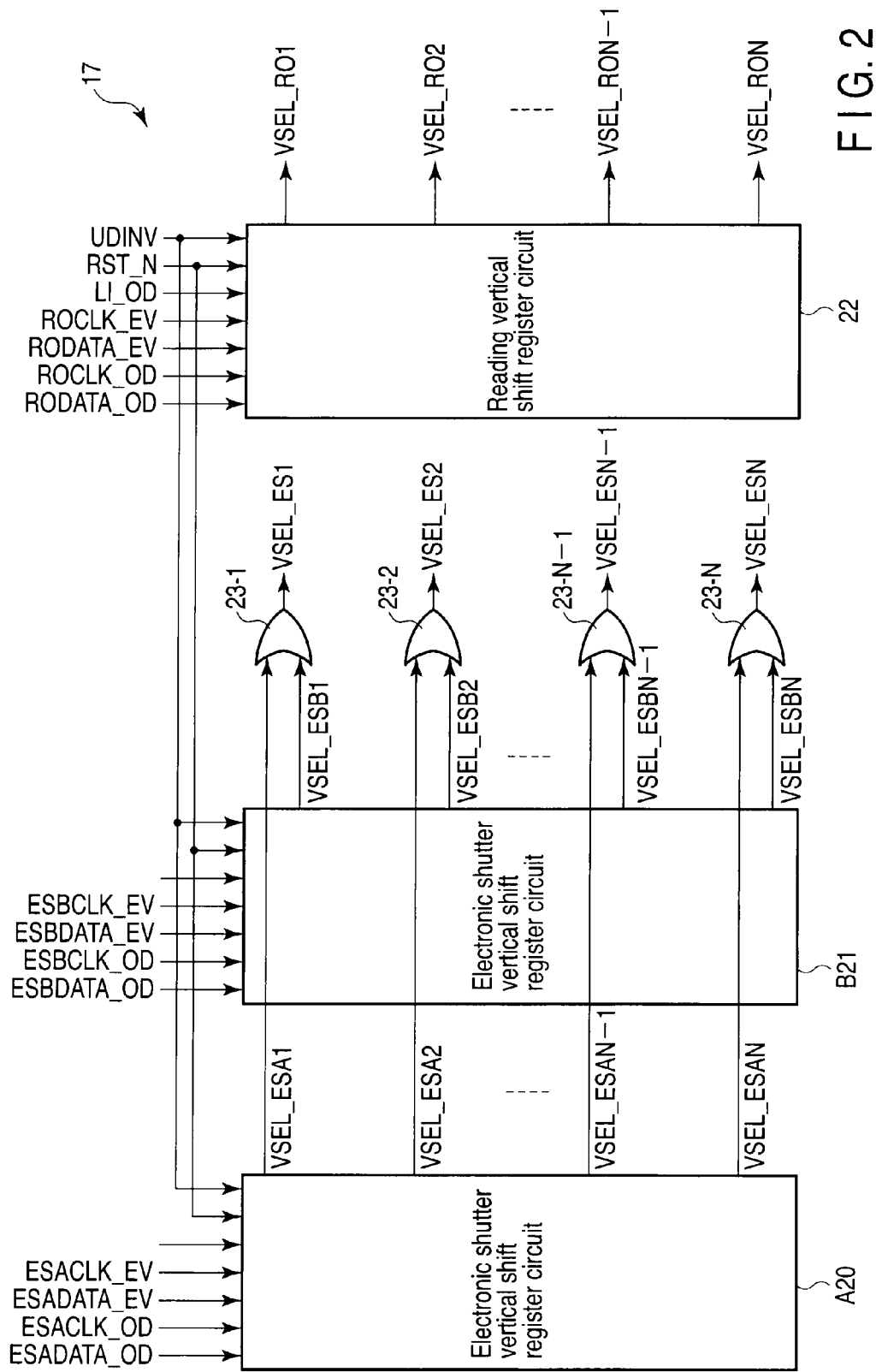
FIG. 2 is a diagram showing one example of the design of a vertical shift register circuit of the CMOS image sensor of FIG. 1.

Embodiments of this invention will be explained in detail below with reference to the accompanying drawings. It should be noted that the drawings are schematic ones and the dimensions and ratios shown in the drawings are different from the actual ones. Further, portions in which the relation of the dimensions and/or the ratios thereof vary from drawing to drawing are of course contained in the drawings. Particularly, the following embodiments are directed to a device and a method for embodying the technical concept of this invention as an example and the technical concept of this invention is not specified by the shape, structure or arrangement of constituents. Various changes and modifications can be made to the technical concept of this invention without departing from the scope thereof.

Embodiment 1

Design

FIG. 1 shows a design example of a solid-state image sensing device according to an embodiment 1 of this invention. In the embodiment 1, a case wherein a CMOS image sensor is taken as an example is explained.

As shown in FIG. 1, unit cells 12-11, 12-12, . . . , 12-NM used as pixels are arranged in a two-dimensional array of N rows and M columns in an image sensing region 11. Vertical signal lines VLIN1, VLIN2, . . . , VLINM are connected to respective unit cell rows.

On one end (for example, on the upper end) of the image sensing region 11, a current source 1, current source 2, . . . , current source M for source-follower circuits are arranged in a horizontal direction. The current source 1, current source 2, . . . , current source M are connected between one-side ends of the vertical signal lines VLIN1, VLIN2, . . . , VLINM and the ground node.

The other ends (for example, the lower end of the image sensing region 11) of the vertical signal lines VLIN1, VLIN2, . . . , VLINM are connected to a column-type analog-to-digital converter circuit 13, latch circuit 14, line memory (10-bit output) 15 and horizontal shift register circuit 16. The latch circuit 14 latches a signal subjected to the analog-to-digital conversion. The line memory 15 stores the latched signal. The horizontal shift register circuit 16 is used to read the signal of the line memory 15.

A vertical shift register circuit 17 and pulse selector circuit 18 are provided near the image sensing region 11. The pulse selector circuit 18 supplies pulse signals ADRES1, ADRES2, . . . , ADRESN, pulse signals RESET1, RESET2, . . . , RESETN and pulse signals (read pulses) READ1, READ2, . . . , READN to the respective unit cell rows.

The analog-to-digital converter circuit 13, latch circuit 14, line memory 15, horizontal shift register circuit 16, vertical shift register circuit 17 and pulse selector circuit 18 are controlled by a timing generator circuit 19. The timing generator circuit 19 generates various types of control signals according to a horizontal sync pulse.

The vertical shift register circuit 17 outputs row select signals VSEL_RO1, VSEL_RO2, . . . , VSEL_RON and row select signals VSEL_ES1, VSEL_ES2, . . . , VSEL_ESN. A specified row in the image sensing region 11 is selected according to the select signals.

Each of the unit cells 12-11, 12-12, . . . , 12-NM comprises four transistors (row select transistor Ta, amplifier transistor Tb acting as an amplifier circuit, reset transistor Tc acting as a reset circuit, read transistor Td acting as a read circuit) and a photodiode (photoelectric converter circuit) PD. If the unit cell 12-11 is taken as an example, the current paths of the transistors Ta, Tb are serially connected between a power source VDD and the vertical signal line VLIN1. The gate of the transistor Ta receives the pulse signal ADRES1. The current path of the transistor Tc is connected between the power source VDD and the gate (detecting portion FD) of the transistor Tb and the gate thereof receives the pulse signal RESET1. Further, one end of the current path of the transistors Td is connected to the detecting portion FD and the gate thereof receives the pulse signal READ1. The cathode of the photodiode PD is connected to the other end of the current path of the transistors Td and the anode of the photodiode PD is grounded.

FIG. 2 shows a design example of the vertical shift register circuit 17 shown in FIG. 1. The vertical shift register circuit 17 comprises an electronic shutter vertical shift register circuit A20, electronic shutter vertical shift register circuit B21, reading vertical shift register circuit 22 and OR gates 23-1, 23-2, . . . , 23-N. The shift register circuits A20, B21, 22 receive various types of control signals from the timing generator circuit 19.

For example, the electronic shutter vertical shift register circuit A20 receives data input (odd number) ESA-DATA_OD, clock signal (odd number) ESACLK_OD, data input (even number) ESADATA_EV, clock signal (even number) ESACLK_EV, up/down inversion signal UDINV and reset signal (negative logic) RST_N.

The electronic shutter vertical shift register circuit B21 receives data input (odd number) ESBDATA_OD, clock signal (odd number) ESBCLK_OD, data input (even number) ESBDATA_EV, clock signal (even number) ESBCLK_EV, up/down inversion signal UDINV and reset signal (negative logic) RST_N.

The reading vertical shift register circuit 22 receives data input (odd number) RODATA_OD, clock signal (odd number) ROCLK_OD, data input (even number) RODATA_EV, clock signal (even number) ROCLK_EV, shift register control signal LI_OD, up/down inversion signal UDINV and reset signal (negative logic) RST_N.

The electronic shutter vertical shift register circuit A20 outputs select signals VSEL_ESA1, VSEL_ESA2, ..., VSEL_ESAN. The electronic shutter vertical shift register circuit B21 outputs select signals VSEL_ESB1, VSEL_ESB2, ..., VSEL_ESBN. The reading vertical shift register circuit 22 outputs row select signals VSEL_RO1, VSEL_RO2, ..., VSEL_RON. The outputs of the electronic shutter vertical shift register circuits A20 and B21 are respectively supplied to the OR gates 23-1, 23-2, ..., 23-N for respective corresponding rows. The OR gates 23-1, 23-2, ..., 23-N output row select signals VSEL_ES1, VSEL_ES2, ..., VSEL_ESN.

FIG. 3 shows an example of the design of the electronic shutter vertical shift register circuit A20 of FIG. 2. The electronic shutter vertical shift register circuit A20 comprises shift registers 32, 33. In the shift register 32, registers 30-1, 30-3, ..., 30-N-1 are serially connected in order of the registers 30-1, 30-3, ..., 30-N-1 via respective selectors 31-1, 31-3, ..., 31-N-1, and serially connected in order of the registers 30-N-1, 30-N-3, ..., 30-1 via the respective selectors 31-N-1, 31-N-3, ..., 31-1. Likewise, in the shift register 33, registers 30-2, 30-4, ..., 30-N are serially connected in order of the registers 30-2, 30-4, ..., 30-N via respective selectors 31-2, 31-4, ..., 31-N, and serially connected in order of the registers 30-N, 30-N-2, ..., 30-2 via the respective selectors 31-N, 31-N-2, ..., 31-2.

The clock signal ESACLK_OD is input to the registers 30-1, 30-3, ..., 30-N-1. The data input ESADATA_OD is input to the selectors 31-1, 31-N-1. The reset signal RST_N is input to the registers 30-1, 30-3, ..., 30-N-1. The up/down inversion signal UDINV is commonly input to the selectors 31-1, 31-3, ..., 31-N-1 as a select signal. When the up/down inversion signal UDINV is "0", the shifting direction of data in the shift register 32 is set to a forward direction. That is, a signal input as the data input ESADATA_OD is sequentially transferred in order of the registers 30-1, 30-3, ..., 30-N-1. On the other hand, when the up/down inversion signal UDINV is "1", the shifting direction of data in the shift register 32 is set to the opposite direction and a signal input as the data input ESADATA_OD is sequentially transferred in order of the registers 30-N-1, 30-N-3, ..., 30-1.

The clock signal ESACLK_EV is input to the registers 30-2, 30-4, ..., 30-N. The data input ESADATA_EV is input to the selectors 31-2, 31-N. The reset signal RST_N is input to the registers 30-2, 30-4, ..., 30-N. The up/down inversion signal UDINV is commonly input to the selectors 31-2, 31-4, ..., 31-N as a select signal. When the up/down inversion signal UDINV is "0", the shifting direction of data in the shift register 32 is set to a forward direction. That is, a signal input as the data input ESADATA_EV is sequentially transferred in order of the registers 30-2, 30-4, ..., 30-N. On the other hand, when the up/down inversion signal UDINV is "1", the shifting direction of data in the shift register 32 is set to the opposite direction and a signal input as the data input ESADATA_EV is sequentially transferred in order of the registers 30-N, 30-N-4, ..., 30-2.

Outputs Q of the registers 30-1, 30-2, ..., 30-N are taken as outputs (select signals VSEL_ESA1, VSEL_ESA2, ..., VSEL_ESAN) of the electronic shutter vertical shift register circuit A20.

Figure 4:
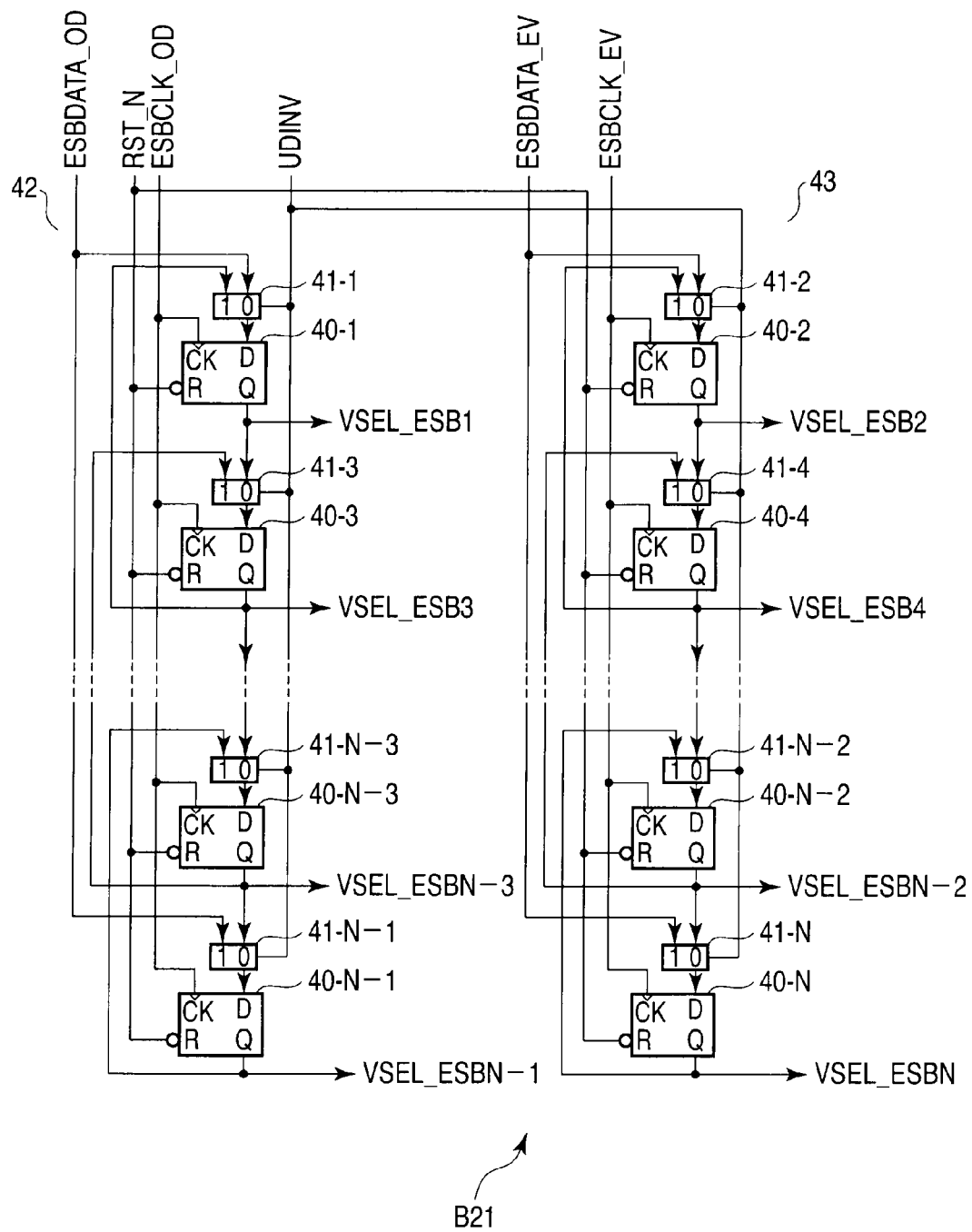
FIG. 4 shows the design of an electronic shutter vertical shift register circuit (B21) of the vertical shift register circuit of FIG. 2.

FIG. 4 shows an example of the design of the electronic shutter vertical shift register circuit B21 of FIG. 2. The design and operation thereof are exactly the same as those of the electronic shutter vertical shift register circuit A20, and therefore, only the design thereof is simply explained.

The electronic shutter vertical shift register circuit B21 comprises shift registers 42, 43. In the shift register 42, registers 40-1, 40-3, ..., 40-N-1 are serially connected in order of the registers 40-1, 40-3, ..., 40-N-1 via respective selectors 41-1, 41-3, ..., 41-N-1, and serially connected in order of the registers 40-N-1, 40-N-3, ..., 40-1 via the respective selectors 41-N-1, 41-N-3, ..., 41-1. Likewise, in the shift register 43, registers 40-2, 40-4, ..., 40-N are serially connected in order of the registers 40-2, 40-4, ..., 40-N via respective selectors 41-2, 41-4, ..., 41-N, and serially connected in order of the registers 40-N, 40-N-2, ..., 40-2 via the respective selectors 41-N, 41-N-2, ..., 41-2.

The clock signal ESBCLK_OD is input to the registers 40-1, 40-3, ..., 40-N-1. The data input ESBDATA_OD is input to the selectors 41-1, 41-N-1. The reset signal RST_N is input to the registers 40-1, 40-3, ..., 40-N-1. The up/down inversion signal UDINV is commonly input to the selectors 41-1, 41-3, ..., 41-N-1 as a select signal.

The clock signal ESBCLK_EV is input to the registers 40-2, 40-4, ..., 40-N. The data input ESBDATA_EV is input to the selectors 41-2, 41-N. The reset signal RST_N is input to the registers 40-2, 40-4, ..., 40-N. The up/down inversion signal UDINV is commonly input to the selectors 41-2, 41-4, ..., 41-N as a select signal.

Outputs Q of the registers 40-1, 40-2, ..., 40-N are taken as outputs (select signals VSEL_ESB1, VSEL_ESB2, ..., VSEL_ESBN) of the electronic shutter vertical shift register circuit B21.

Figure 5:
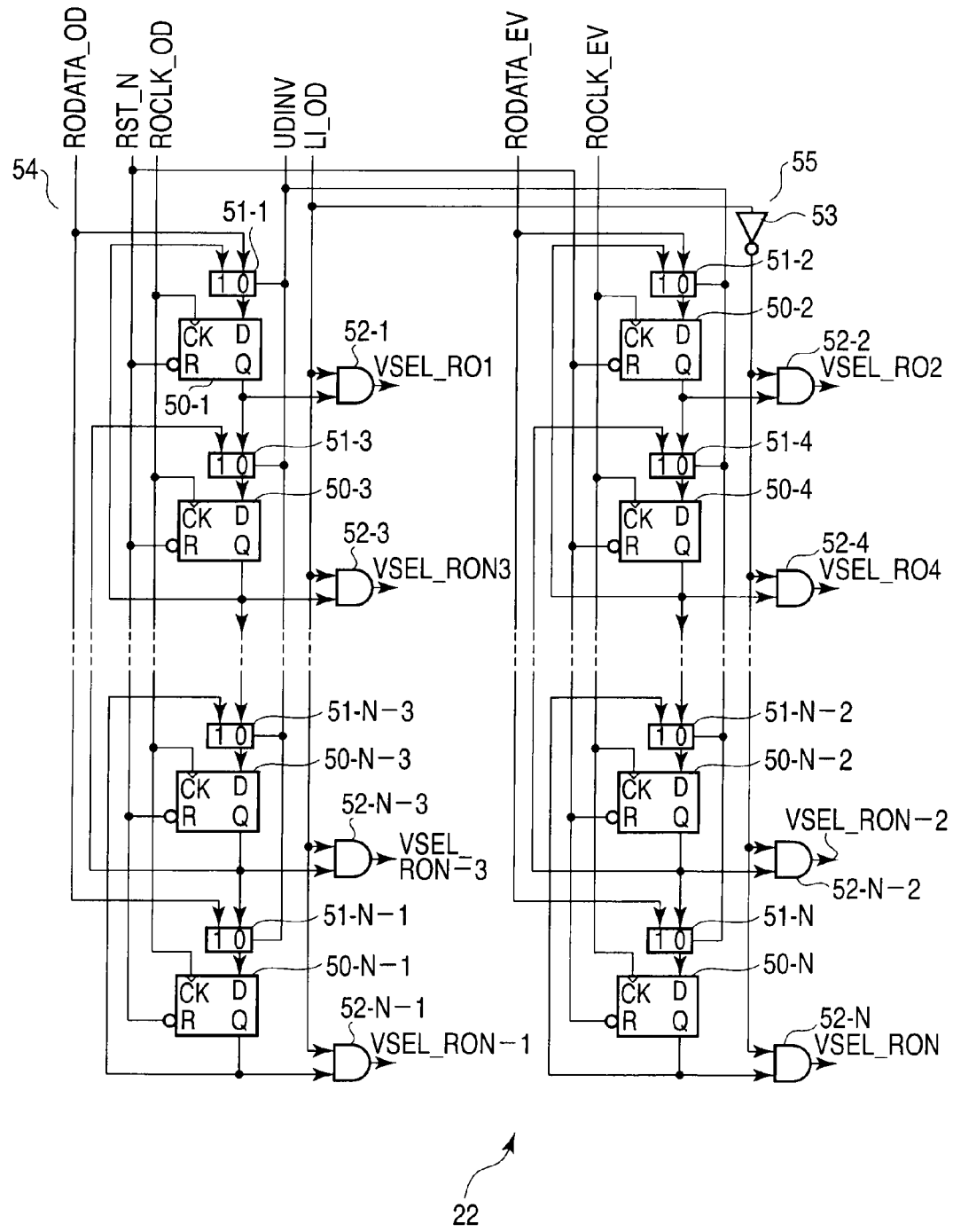
FIG. 5 shows the design of a reading vertical shift register circuit of the vertical shift register circuit of FIG. 2.

FIG. 5 shows an example of the design of the reading vertical shift register circuit 22 of FIG. 2. The design thereof is basically the same as that of the electronic shutter vertical shift register circuits A20, B21. The reading vertical shift register circuit 22 comprises shift registers 54, 55. Registers 50-1, 50-3, ..., 50-N-1 and selectors 51-1, 51-3, ..., 51-N-1 configure the shift register 54. Respective outputs of the shift register 54 are input to AND gates 52-1, 52-3, ..., 52-N-1. The AND gates 52-1, 52-3, ..., 52-N-1 are controlled by a shift register control signal LI_OD. Likewise, registers 50-2, 50-4, ..., 50-N and selectors 51-2, 51-4, ..., 51-N configure the shift register 55. Respective outputs of the shift register 55 are input to AND gates 52-2, 52-4, ..., 52-N. The AND gates 52-2, 52-4, ..., 52-N are controlled by the shift register control signal LI_OD supplied thereto via an inverter 53.

The registers 50-1, 50-3, ..., 50-N-1 are serially connected in order of the registers 50-1, 50-3, ..., 50-N-1 via the respective selectors 51-1, 51-3, ..., 51-N-1, and serially connected in order of 50-N-1, 50-N-3, ..., 50-1 via the respective selectors 51-N-1, 51-N-3, ..., 51-1. The registers 50-1, 50-3, ..., 50-N-1 are respectively connected to one-side input terminals of the AND gates 52-1, 52-3, ..., 52-N-1. Likewise, the registers 50-2, 50-4, ..., 50-N are serially connected in order of the registers 50-2, 50-4, ..., 50-N via the respective selectors 51-2, 51-4, . . . , 51-N, and serially connected in order of the registers 50-N, 50-N-2, . . . , 50-2 via the respective selectors 51-N, 51-N-2, . . . , 51-2. The registers 50-2, 50-4, . . . , 50-N are respectively connected to one-side input terminals of the AND gates 52-2, 52-4, . . . , 52-N.

The clock signal ROCLK_OD is input to the registers 50-1, 50-3, . . . , 50-N-1. The data input RODATA_OD is input to the selectors 51-1, 51-N-1. The reset signal RST_N is input to the registers 50-1, 50-3, . . . , 50-N-1. The up/down inversion signal UDINV is commonly input to the selectors 51-1, 51-3, . . . , 51-N-1 as a select signal. The shift register control signal LI_OD is input to the other input terminals of the AND gates 52-1, 52-3, . . . , 52-N-1.

The clock signal ROCLK_EV is input to the registers 50-2, 50-4, . . . , 50-N. The data input RODATA_EV is input to the selectors 51-2, 51-N. The reset signal RST_N is input to the registers 50-2, 50-4, . . . , 50-N. The up/down inversion signal UDINV is commonly input to the selectors 51-2, 51-4, . . . , 51-N as a select signal. The shift register control signal LI_OD is input to the other input terminals of the AND gates 52-2, 52-4, . . . , 52-N via an inverter 53.

When the shift register control signal LI_OD is "1", row select signals VSEL_RO1, VSEL_RO3, . . . , VSEL_RON-1 are respectively output from the AND gates 52-1, 52-3, . . . , 52-N-1 and "0" is always output from the AND gates 52-2, 52-4, . . . , 52-N. On the other hand, when the shift register control signal LI_OD is "0", row select signals VSEL_RO2, VSEL_RO4, . . . , VSEL_RON are respectively output from the AND gates 52-2, 52-4, . . . , 52-N and "0" is always output from the AND gates 52-1, 52-3, . . . , 52-N-1.

Figure 6:
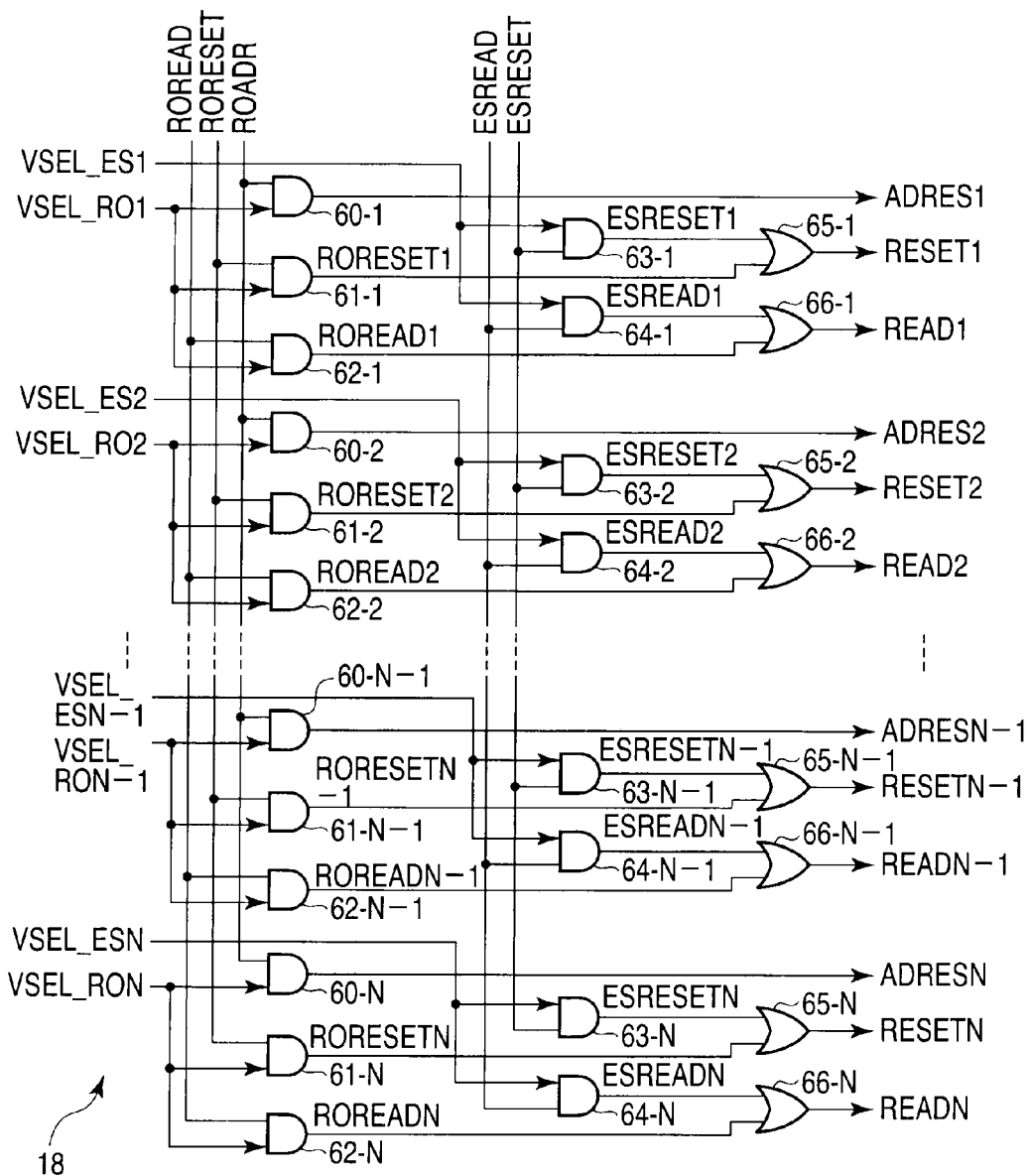
FIG. 6 shows one example of the design of a pulse selector circuit of the CMOS image sensor of FIG. 1.

FIG. 6 shows an example of the pulse selector circuit 18 of FIG. 1. The pulse selector circuit 18 comprises AND gates 60-1, 60-2, . . . , 60-N, 61-1, 61-2, . . . , 61-N, 62-1, 62-2, . . . , 62-N, 63-1, 63-2, . . . , 63-N, 64-1, 64-2, . . . , 64-N and OR gates 65-1, 65-2, . . . , 65-N, 66-1, 66-2, . . . , 66-N.

Since each row has the same design, the first row is explained as an example. Pixel reading drive pulses ROADR, ROREAD, RORESET are selected according to the output (row select signal VSEL_RO1) of the vertical shift register circuit 17 by means of the AND gates 60-1, 61-1, 62-1. When the row select signal VSEL_RO1 is "1", the pixel reading drive pulses ROADR, ROREAD, RORESET are output as respective outputs ADRES1, RORESET1, ROREAD1 of the AND gates 60-1, 61-1, 62-1. The output of the AND gate 60-1 is output to the unit cells 12-11, 12-12, . . . , 12-M as a pulse signal ADRES1. When the row select signal VSEL_RO1 is "0", "0" is output as the outputs ADRES1, RORESET1, ROREAD1.

Further, pixel discharging drive pulses ESREAD, ESRESET are selected according to the output (row select signal VSEL_ES1) of the vertical shift register circuit 17 by means of the AND gates 63-1, 64-1. When the row select signal VSEL_ES1 is "1", the pixel discharging drive pulses ESREAD, ESRESET are output as respective outputs ESRESET1, ESREAD1 of the AND gates 63-1, 64-1. When the row select signal VSEL_ES1 is "0", "0" is output as the outputs ESRESET1, ESREAD1.

The pulse signals selected by the row select signals VSEL_RO1, VSEL_ES1 are combined in the OR gates 65-1, 66-1. The OR gate 65-1 receives the output RORESET1 of the AND gate 61-1 and the output ESRESET1 of the AND gate 63-1 and outputs the pulse signal RESET1 to the unit cells 12-11, 12-12, . . . , 12-1M. The OR gate 66-1 receives the output ROREAD1 of the AND gate 62-1 and the output ESREAD1 of the AND gate 64-1 and outputs the pulse signal READ1 to the unit cells 12-11, 12-12, . . . , 12-1M.

The pixel reading drive pulses ROADR, ROREAD, RORESET and pixel discharging drive pulses ESREAD, ESRESET are supplied from the timing generator circuit 19, for example.

[Operation (Function)]

Figure 7A:
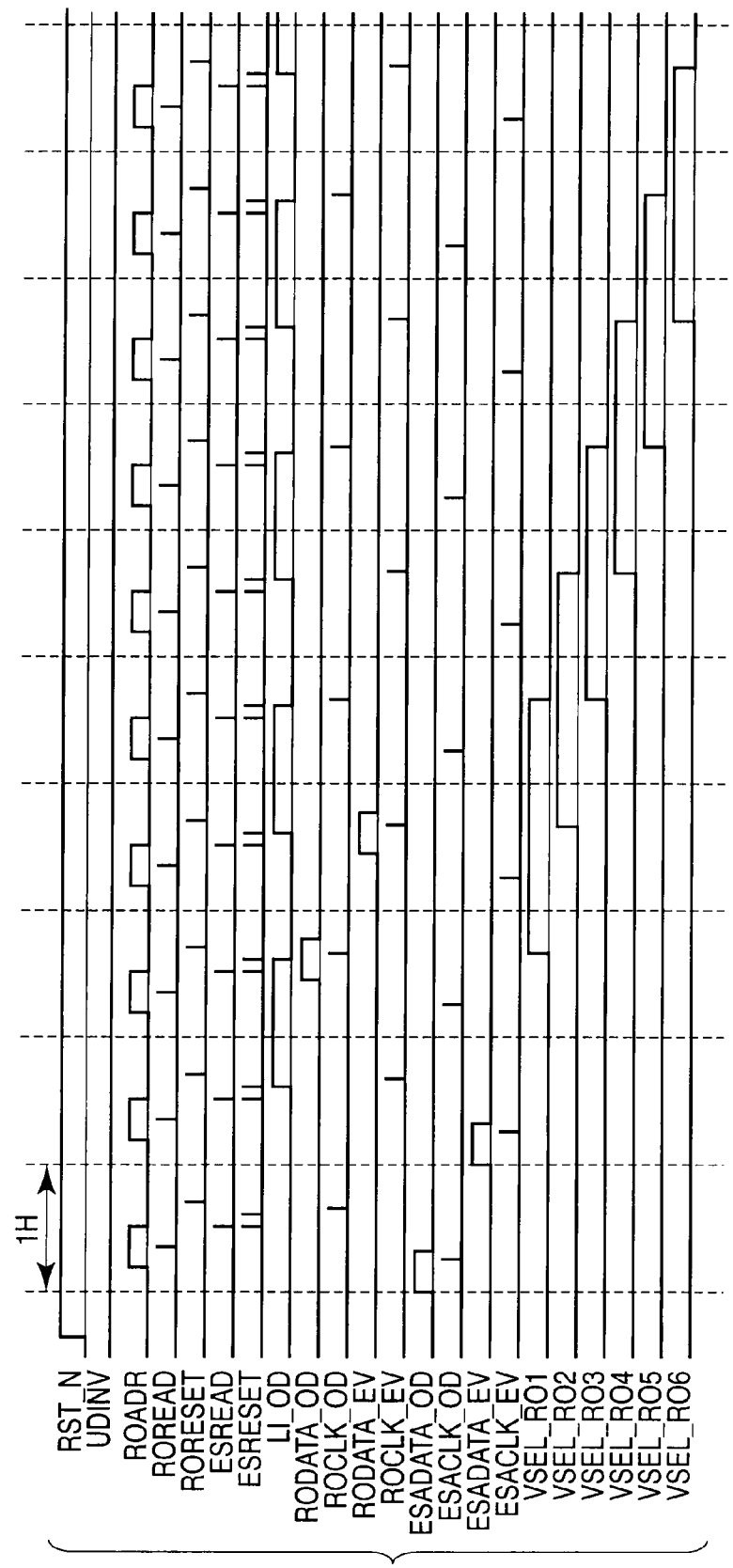

FIG. 7A and FIG. 7B show sensor operation timing at the "standard" time in the above design. FIG. 7A and FIG. 7B are timing charts when the up/down inversion signal UDINV is "0" and shows the operation in a normal direction (forward direction). When the up/down inversion signal UDINV is "1", the shifting directions of data in the shift registers 32, 33, 42, 43, 54, 55 are set in an opposite direction (reversed), the row select sequence is reversed and a vertically reversed photographed image can be attained. Since the operations in the normal direction and in the reversed direction are basically the same, only the operation in the normal direction is explained. The operation when the electronic shutter vertical shift register circuit A20 is used is shown here. In the case of the electronic shutter vertical shift register circuit B21, the operation is the same since the circuit design is the same. The reason why two electronic shutter vertical shift registers with the same design are used will be described later.

After the reset signal RST_N is changed from "0" to "1" to release the reset state, the pixel reading drive pulses ROADR, ROREAD, RORESET and pixel discharging drive pulses ESREAD, ESRESET are input at common timing for each horizontal period (horizontal sync pulse) 1H by means of the timing generator circuit 19. Further, the shift register control signal LI_OD, clock signals ROCLK_OD, ROCLK_EV and clock signals ESACLK_OD, ESACLK_EV are input at common timing on every other horizontal period 1H by means of the timing generator circuit 19.

As shown in the drawing, the operations of the shift registers 32, 33 are started to start the drive operations for each unit cell row by controlling the input timings of the data inputs RODATA_OD, RODATA_EV, ESADATA_OD, ESADATA_EV. The time difference between the data input ESADATA_OD and data input RODATA_OD (the time difference between ESADATA_EV and RODATA_EV) corresponds to an electronic shutter time (storage time).

First, the electronic shutter (charge discharging) operation is explained. When one clock signal ESACLK_OD is input while the data input ESADATA_OD is "1", "1" is input to the register 30-1 of the shift register 32. When one clock signal ESACLK_EV is input while the data input ESADATA_EV is "1" in the next horizontal period 1H, "1" is input to the register 30-2 of the shift register 33.

Since the clock signals ESACLK_OD, ESACLK_EV are input on every other horizontal period 1H, the row select signals VSEL_ES1, VSEL_ES2, . . . , VSEL_ESN become pulses with the time length of two horizontal periods 2H. Pixel discharging drive pulses ESREAD, ESRESET are supplied to the unit cell rows selected by the pulse selector 18 according to the row select signals VSEL_ES1, VSEL_ES2, . . . , VSEL_ESN.

In a unit cell 12-$i$, charges stored in the photodiode PD are discharged to the power source VDD by simultaneously making pulse signals RESETi, READi high to simultaneously turn on the reset and read transistors Tc, Td. Subsequently, only the pulse signal RESETi is made high to turn on the reset transistor Tc and reset the detecting portion FD to a VDD level.

Next, a pixel (signal charge) read operation is explained. As described above, the operation is basically the same as that of the electronic shutter. When one clock signal ROCLK_OD is input while the data input RODATA_OD is "1", "1" is input to the register 50-1 of the shift register 54. When one clock signal ROCLK_EV is input while the data input RODATA_EV is "1" in the next horizontal period 1H, "1" is input to the register 50-2 of the shift register 55.

The row select signals VSEL_RO1, VSEL_RO2, ..., VSEL_RON are sequentially set to "1" by the clock signals ROCLK_OD, ROCLK_EV input in every other horizontal period 1H. Like the case of the electronic shutter, the row select signals VSEL_RO1, VSEL_RO2, ..., VSEL_RON are pulses with the time length of two horizontal periods 2H. However, this operation without any countermeasure would result in the same selected row successively read for the two horizontal periods 2H, and two successive signal charges reading timings overlap. To address this, the odd row and even row are alternately selected for each horizontal period 1H by repeatedly setting the shift register control signal LI_OD to "1", "0" for each horizontal period 1H.

In the unit cell 12-$i$ in the selected row, in order to eliminate a noise signal such as a dark current of the detecting portion FD before starting the read operation, the pulse signal RESETi is first made high to set the detecting portion FD to the power source voltage (VDD). Then, when the pulse signal ADRESi is made high, a source follower circuit comprising the amplifying transistor Tb and current source starts operating. When the pulse signal READi is made high, the read transistor Td is turned on to read signal charges accumulated and photo-electrically converted by the photodiode PD in a preset period after discharging. Then, the voltage level of the detecting portion FD is read onto the vertical signal line VLINi. This signal is converted by the analog-to-digital converter circuit 13 and the thus converted digital signal is latched in the latch circuit 14. Thus, signal charges of each unit cell row are read.

Now, the reason why the two electronic shutter vertical shift register circuits with the same circuit design are used is explained.

Figure 8:
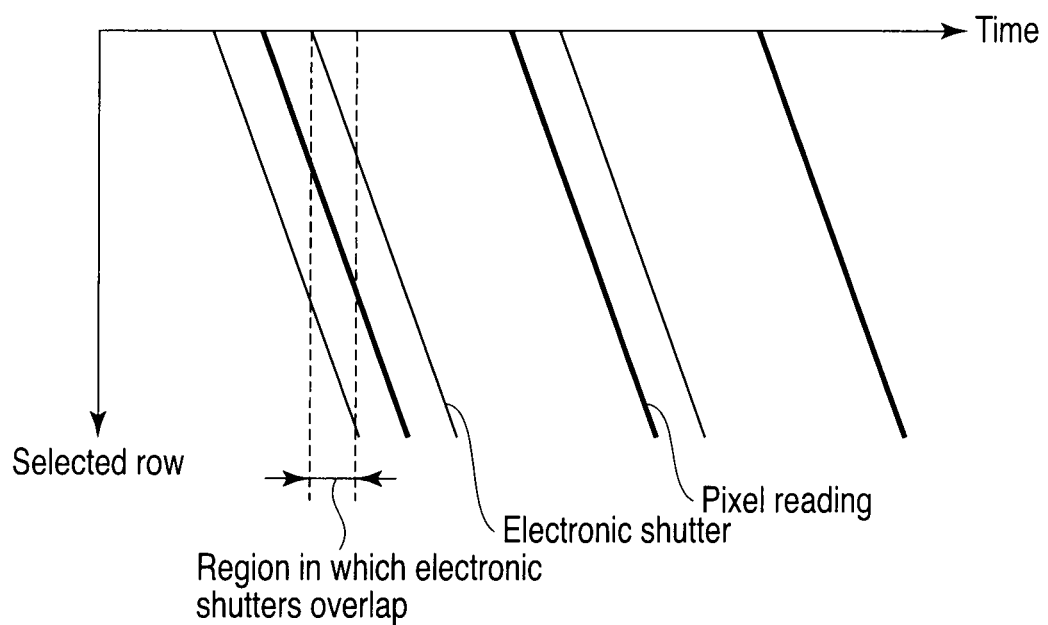
FIG. 8 is a diagram for illustrating the reason why two electronic shutter vertical shift register circuits are used.

FIG. 8 is a diagram in which the abscissa indicates time and the ordinate indicates a selected row. The timing difference between the electronic shutter and pixel reading operations is an electronic shutter time (storage time). As shown in the drawing, since the electronic shutter time according to the embodiment is longer than the case without the embodiment, two types of electronic shutters having different start times can overlap. Since a clock signal supplied to the electronic shutter vertical shift register circuit is alternately input to the even row (ESACLK_EV) and odd row (ESACLK_OD) on every other horizontal period 1H, the later electronic shutter needs to start at the timing at which the clock signal ESACLK_OD is input in the case of FIG. 7A and FIG. 7B. Therefore, under this condition, the electronic shutter period would be able to be set only in the unit of two horizontal periods 2H. Further, in the read operation that will be described later, the operation start row is controlled by using a pulse. That is, the number and timing of clock signals ESACLK_OD and ESACLK_EV input at the electronic shutter start time are varied and such operation cannot be realized by using a single electronic shutter vertical shift register circuit.

Therefore, two electronic shutter vertical shift register circuits with the same circuit design are prepared to prevent occurrence of the above condition. At the time of use, the two electronic shutter vertical shift register circuits may be alternately used or the two electronic shutter vertical shift register circuits may be simultaneously used when the above situation occurs.

Figure 9A:
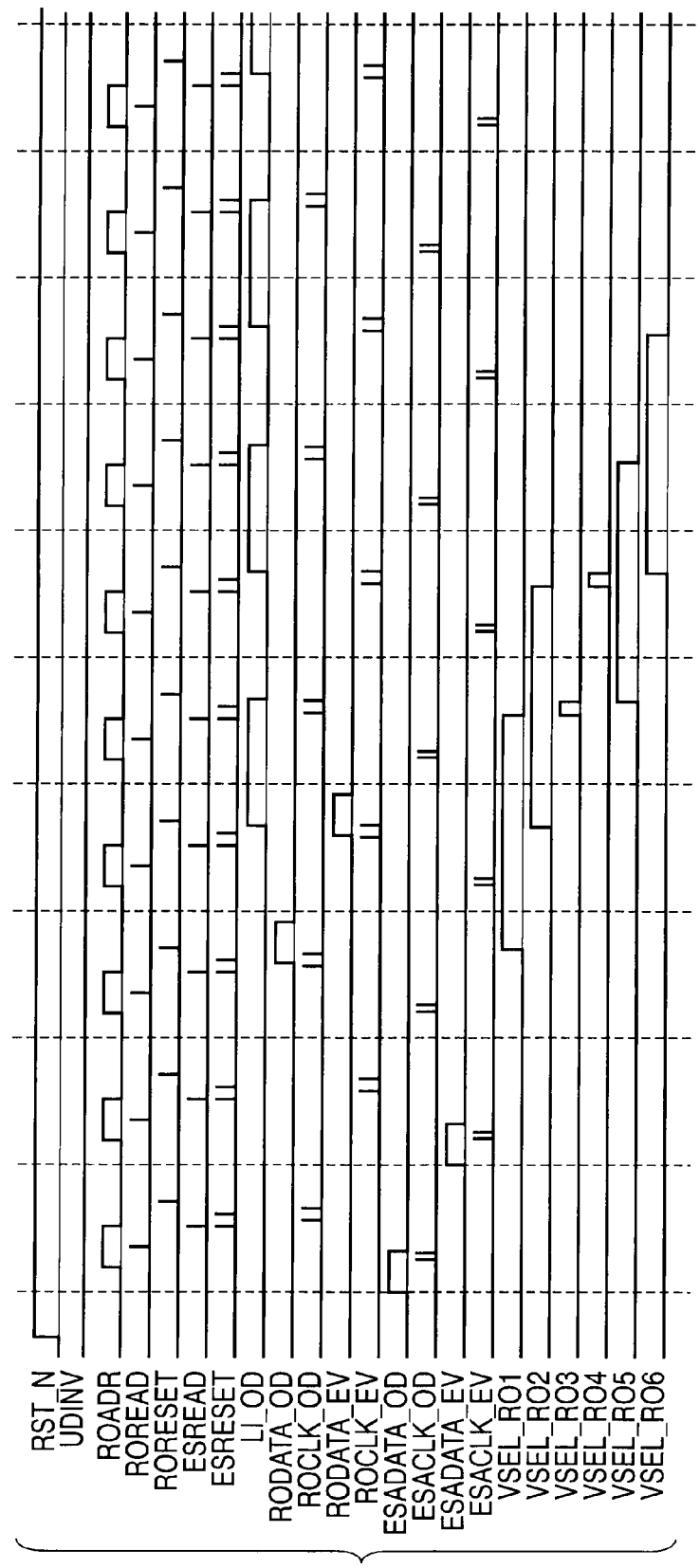
FIG. 9A and FIG. 9B are timing charts for illustrating sensor operation timing (for the vertical sub-sampling).
Figure 9B:
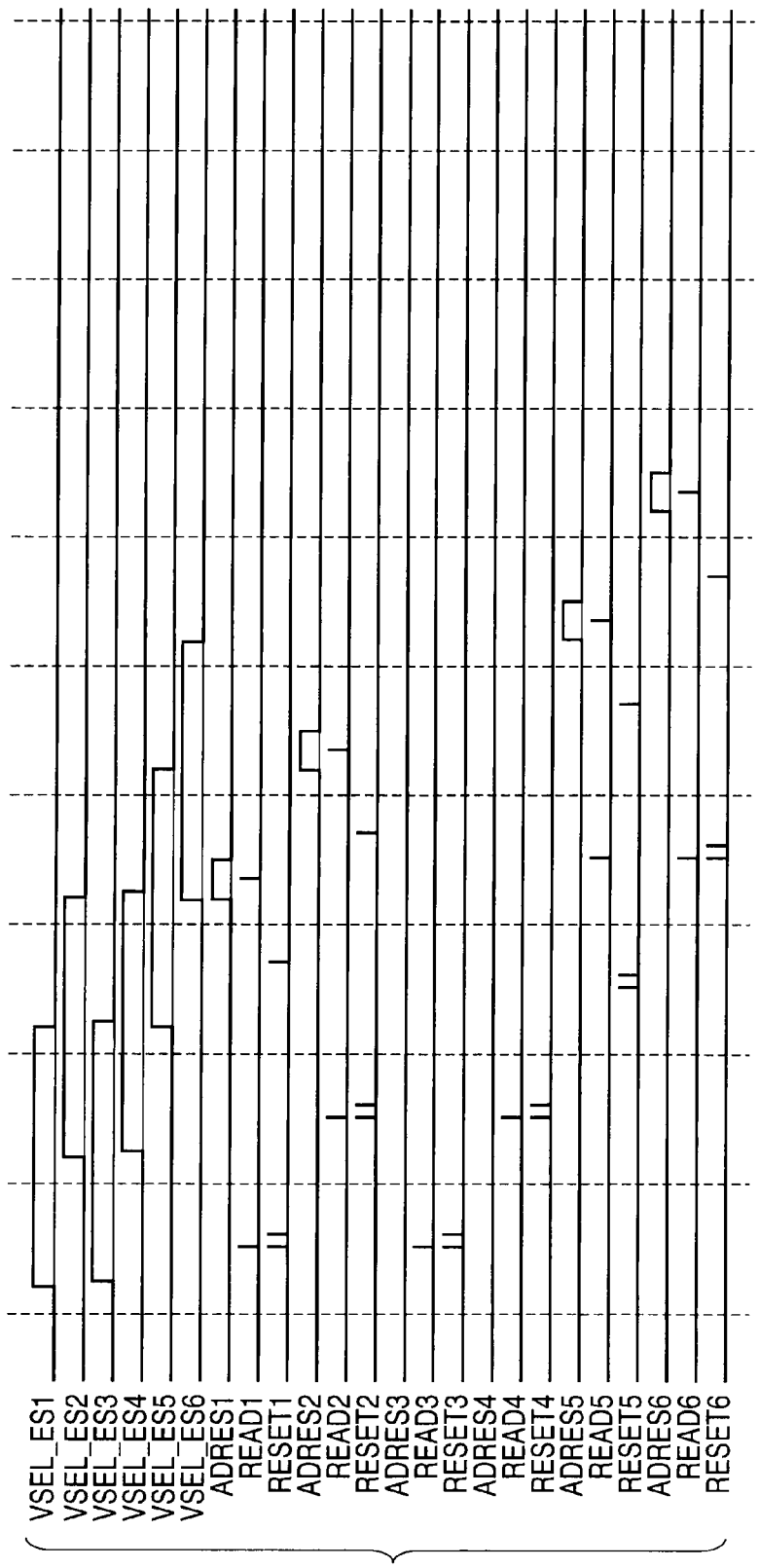

FIG. 9A and FIG. 9B show sensor operation timing for the "vertical sub-sampling". In this example, the "half-sub-sampling" operation in which the number of selected rows is reduced by half is explained. The drawing shows an example in which the read rows are the first, second, fifth and sixth rows.

The operation is different from that at the "standard" time in the number of clock signals ROCLK_OD, ROCLK_EV, ESACLK_OD, ESACLK_EV. In this example, two clock signals are used instead of the single-clock signals ROCLK_OD, ROCLK_EV, ESACLK_OD, ESACLK_EV used at the standard time. The number of clock signals ROCLK_OD, ROCLK_EV, ESACLK_OD, ESACLK_EV corresponds to the number of rows to be sub-sampled. Therefore, the number of rows and the row to be sub-sampled can be freely selected by changing the number of clock signals ROCLK_OD, ROCLK_EV, ESACLK_OD, ESACLK_EV. At the start timing of the electronic shutter, two clock signals ESACLK_OD and two clock signals ESACLK_EV are input in respective periods in which the data inputs ESADATA_OD and ESADATA_EV are high. As a result, the discharge processes for the two rows are performed in parallel. At the read start time point, one clock signal ROCLK_OD and one clock signal ROCLK_EV are input in respective periods in which the data inputs RODATA_OD and RODATA_EV are high. At this time point, if two clock signals ROCLK_OD, ROCLK_EV are input, the "pixel averaging" process that will be described later is performed. In this example, since the "sub-sampling" process is performed, the clock signal ROCLK_OD, ROCLK_EV is input one at a time.

The reason why the electronic shutter is input for the third and fourth rows not to be read (or, to be sub-sampled) is explained. If the electronic shutter is not input to the row that is not to be read, charges that are photo-electrically converted by the photodiode PD accumulate to a specific amount to leak into adjacent pixels via the substrate and cause a problem called blooming. Further, if charges remain accumulated, this degrades the photodiode PD and may rapidly degrade the quality thereof as a sensor. In order to cope with the above problem, charges stored in the photodiode PD must be discharged for the rows that are not to be read.

Figure 10A:
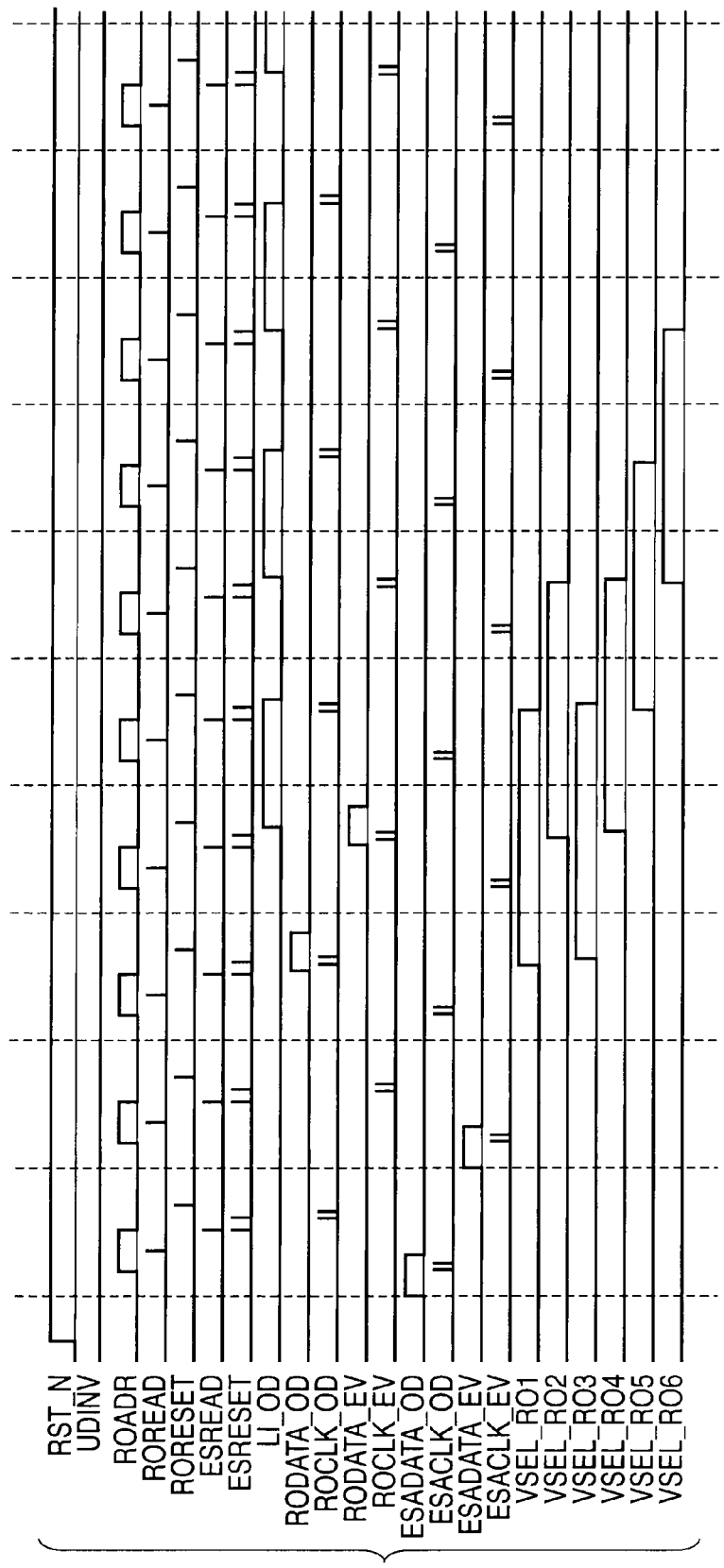

FIG. 10A and FIG. 10B show sensor operation timing for the "pixel averaging". In this example, the operation of "two pixel averaging" is explained. The operation is substantially the same as the "sub-sampling" operation, but as described before, clock signals ROCLK_OD and ROCLK_EV are input two in respective periods in which the data inputs RODATA_OD and RODATA_EV are high. As a result, two rows are read in parallel. The reason why two rows are read in parallel with one row skipped is to average the same colors for the color filter with the Bayer array.

In Jpn. Pat. Appln. KOKAI Publication No. 2007-173950, the circuit design that realizes the "four-pixel averaging" process is shown. However, according to this embodiment, a "pixel averaging" process for a desired number of pixels can be realized by changing the number of input clock signals. Further, like the case of the "sub-sampling" process, the "pixel averaging" and "sub-sampling" processes can be combined by controlling the number of clock signals input while the data inputs RODATA_OD, RODATA_EV are not high. Specifically, the discharge operation is performed for n rows and the read operation is performed for the m rows among n rows, wherein n>m.

Figures 11A, 11B:
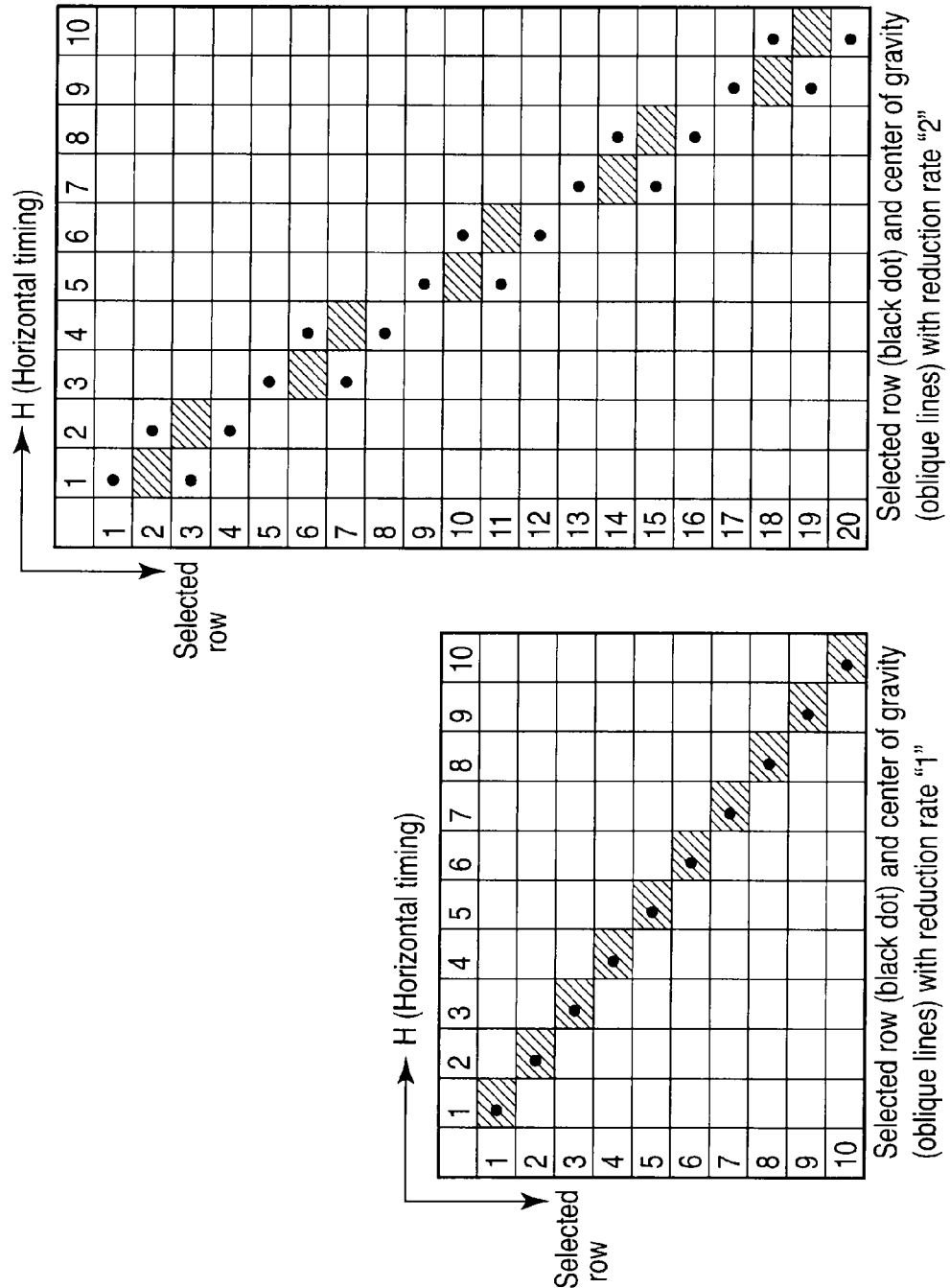

Next, a read method that causes suppressed false color is explained. The ratio of the number of rows read in the "sub-sampling" and "pixel averaging" processes to the number of rows read in the "total-pixel read" process is defined as a reduction rate (for example, the reduction rate for FIG. 7A and FIG. 7B is "1" (FIG. 11A) and the reduction rates for FIGS. 9 and 10 are "2" (FIG. 11B)). When the reduction rate is not lower than "3", possible two read methods includes: one for collectively reading successive odd and even rows as shown in FIG. 11C; and one for reading rows to make the centers of gravity uniform when the "pixel averaging" process is performed as shown in FIG. 11D. The latter method results in spatially uniform reading, and therefore causes suppressed false color at the time of de-mosaicking.

Figure 12A:
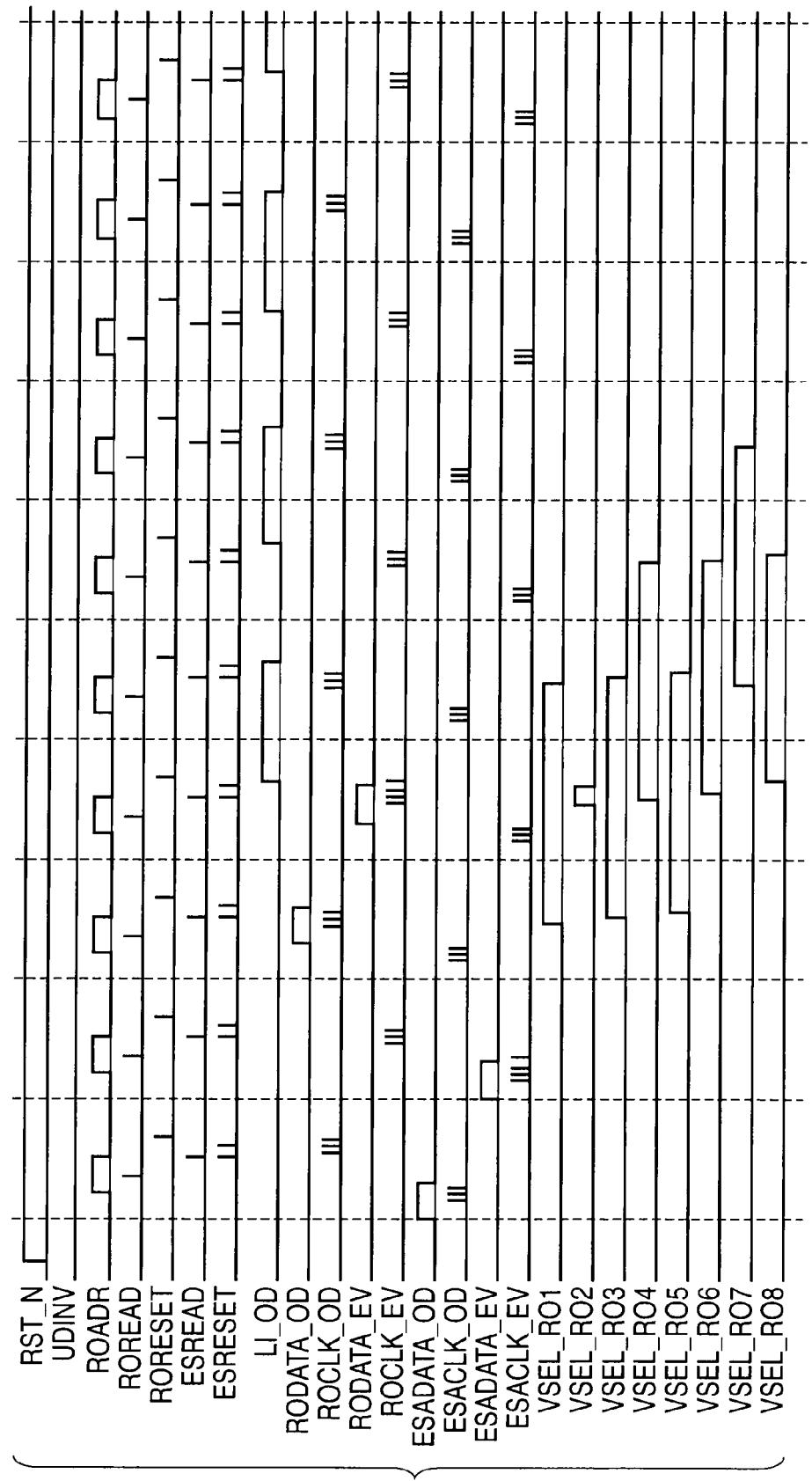
FIG. 12A, FIG. 12B and FIG. 12C are timing charts for illustrating an example in which pixels are read to make the centers of gravity uniform.
Figure 12B:
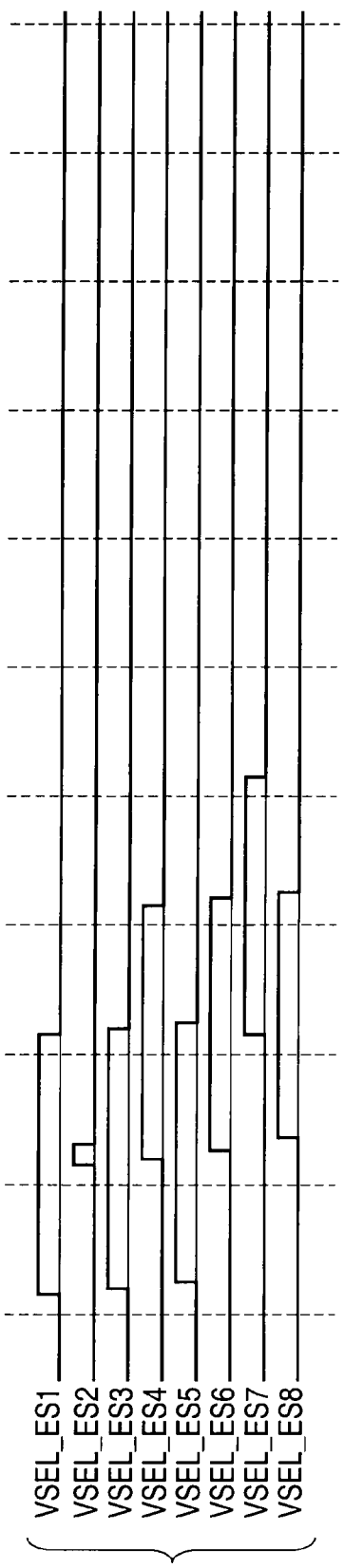
Figure 12C:
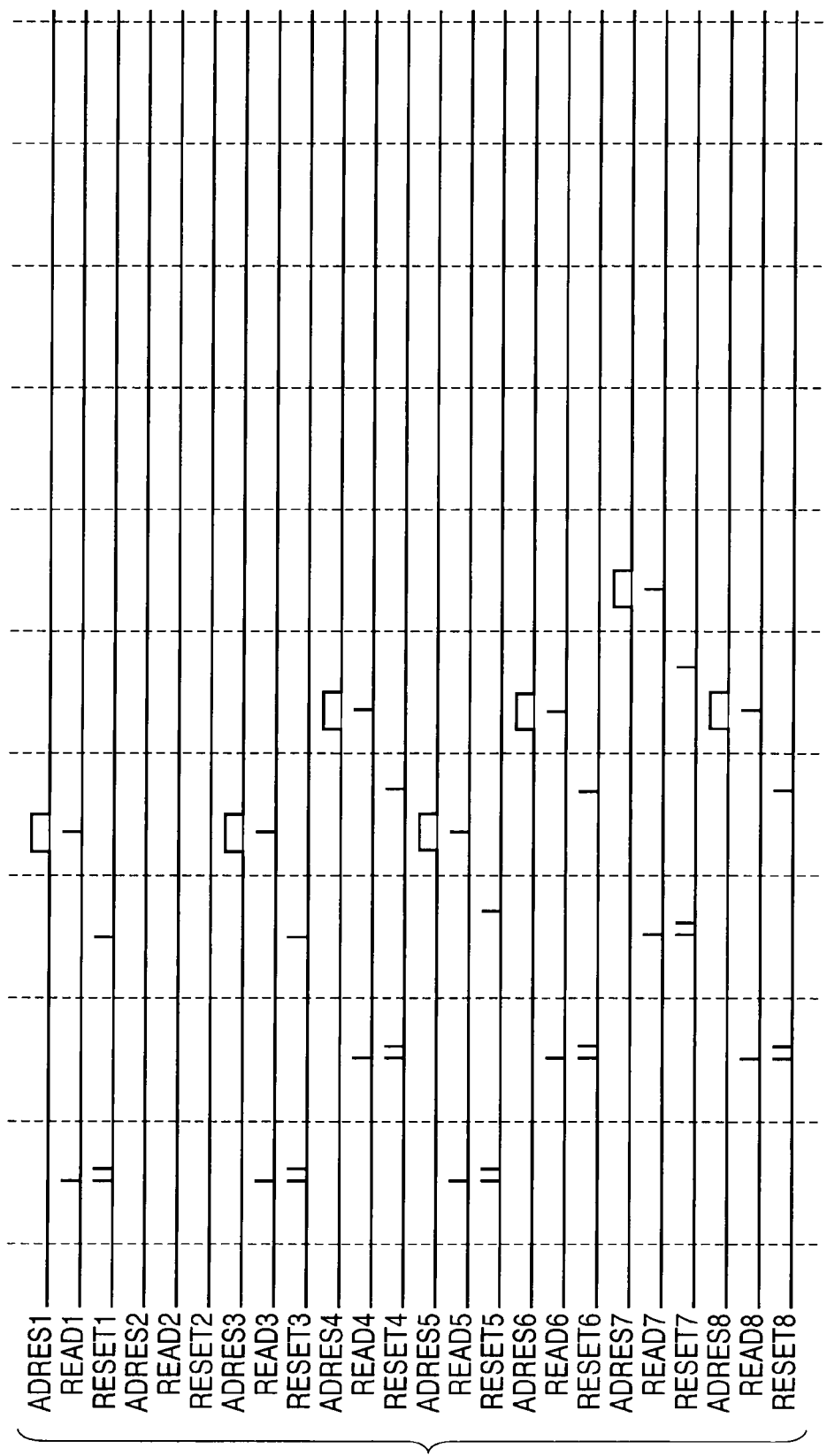

In order to read rows so as to realize uniform centers of gravity, it is sufficient to shift the read start even rows. That is, for the onset of the electronic shutter and reading, for example, it is sufficient to input as many extra clock signals for even rows (ESACLK_EV, ROCLK_EV) as the number of rows to be shifted shown in FIG. 12A, FIG. 12B and FIG. 12C.

[Advantage]

As described above, to-be-sub-sampled rows (reduction rate) can be freely selected and the number of averaged pixels can be freely selected simply by changing the number of clock signals and the input timing thereof without additionally providing a logic gate according to the vertical shift register circuit 17 of this embodiment. Further, the "sub-sampling" and "pixel averaging" processes can be combined. In addition, the read method in which false color is difficult to occur can be realized.

Physical degradation of pixels and degradation of photographed images due to blooming can be suppressed by performing a charge discharging process for a non-selected row.

Further, even if the electronic shutter time is changed, the process can be continuously performed without interrupting the operation by using two electronic shutter vertical shift register circuits.

Embodiment 2

Design

Figure 13:
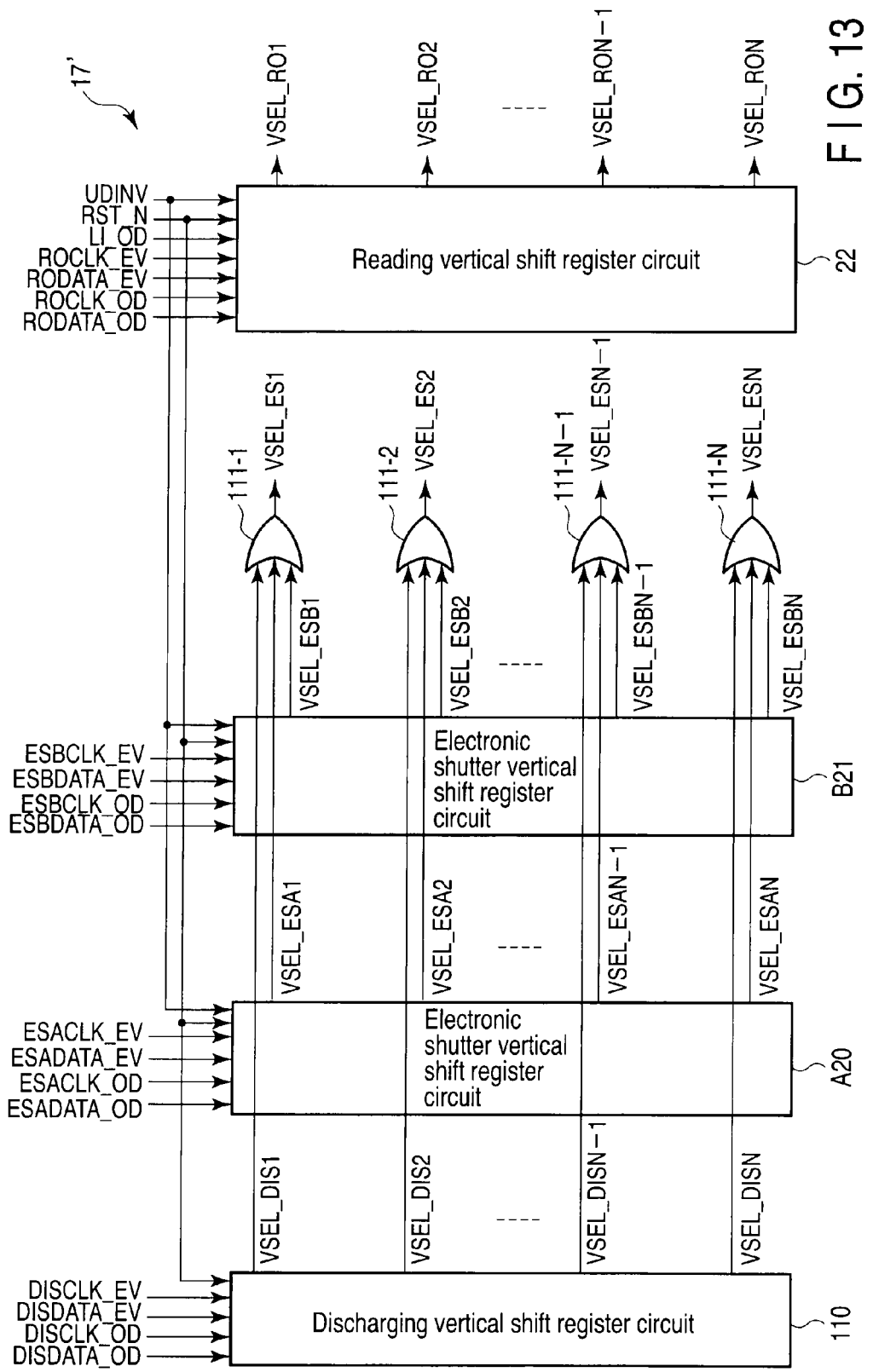
FIG. 13 shows one example of the design of a vertical shift register circuit according to an embodiment 2 of this invention.

FIG. 13 shows an example of the design of a vertical shift register circuit 17' according to an embodiment 2 of this invention. Portions which are the same as those of the embodiment 1 are denoted by the same reference symbols and the detailed explanation thereof is omitted.

As shown in FIG. 13, the vertical shift register circuit 17' of this embodiment comprises an electronic shutter vertical shift register circuit A20, electronic shutter vertical shift register circuit B21, reading vertical shift register circuit 22, discharging vertical shift register circuit 110 and OR gates 111-1, 111-2, . . . , 111-N.

The discharging vertical shift register circuit 110 receives data inputs DISDATA_OD, DISDATA_EV, clock signals DISCLK_OD, DISCLK_EV and reset signal (negative logic) RST_N and outputs select signals VSEL_DIS1, VSEL_DIS2, . . . , VSEL_DISN.

The OR gates 111-1, 111-2, . . . , 111-N respectively receive outputs of the electronic shutter vertical shift register circuit A20 (select signals VSEL_ESA1, VSEL_ESA2, . . . , VSEL_ESAN), outputs of the electronic shutter vertical shift register circuit B21 (select signals VSEL_ESB1, VSEL_ESB2, . . . , VSEL_ESBN) and outputs of the discharging vertical shift register circuit 110 (select signals VSEL_DIS1, VSEL_DIS2, . . . , VSEL_DISN), and respectively output row select signals VSEL_ES1, VSEL_ES2, . . . , VSEL_ESN.

FIG. 14 shows an example of the design of the discharging vertical shift register circuit 110. The discharging vertical shift register circuit 110 comprises shift registers 121, 122. The shift register 121 comprises registers 120-1, 120-3, . . . , 120-N-1. The shift register 122 comprises registers 120-2, 120-4, . . . , 120-N.

The registers 120-1, 120-3, . . . , 120-N-1 receive data input DISDATA_OD, clock signal DISCLK_OD and reset signal RST_N, and output select signals VSEL_DIS1, VSEL_DIS3, . . . , VSEL_DISN-1. The registers 120-2, 120-4, . . . , 120-N receive data input DISDATA_EV, clock signal DISCLK_EV and reset signal RST_N, and output select signals VSEL_DIS2, VSEL_DIS4, . . . , VSEL_DISN.

[Operation (Function)]

According to the design of the embodiment 2, the "free cutting-out" process can be realized. In the process for cutting out a part of the screen (photographed image), a charge discharging process is required for rows other than a to-be-cutout object as explained in the embodiment 1. In the following description, the row that is other than the to-be-cutout object and subjected to the discharging process is called a normally discharging row. For the normally discharging row, the charge discharging process (row selection) is performed by means of the discharging vertical shift register circuit 110.

Figure 15C:
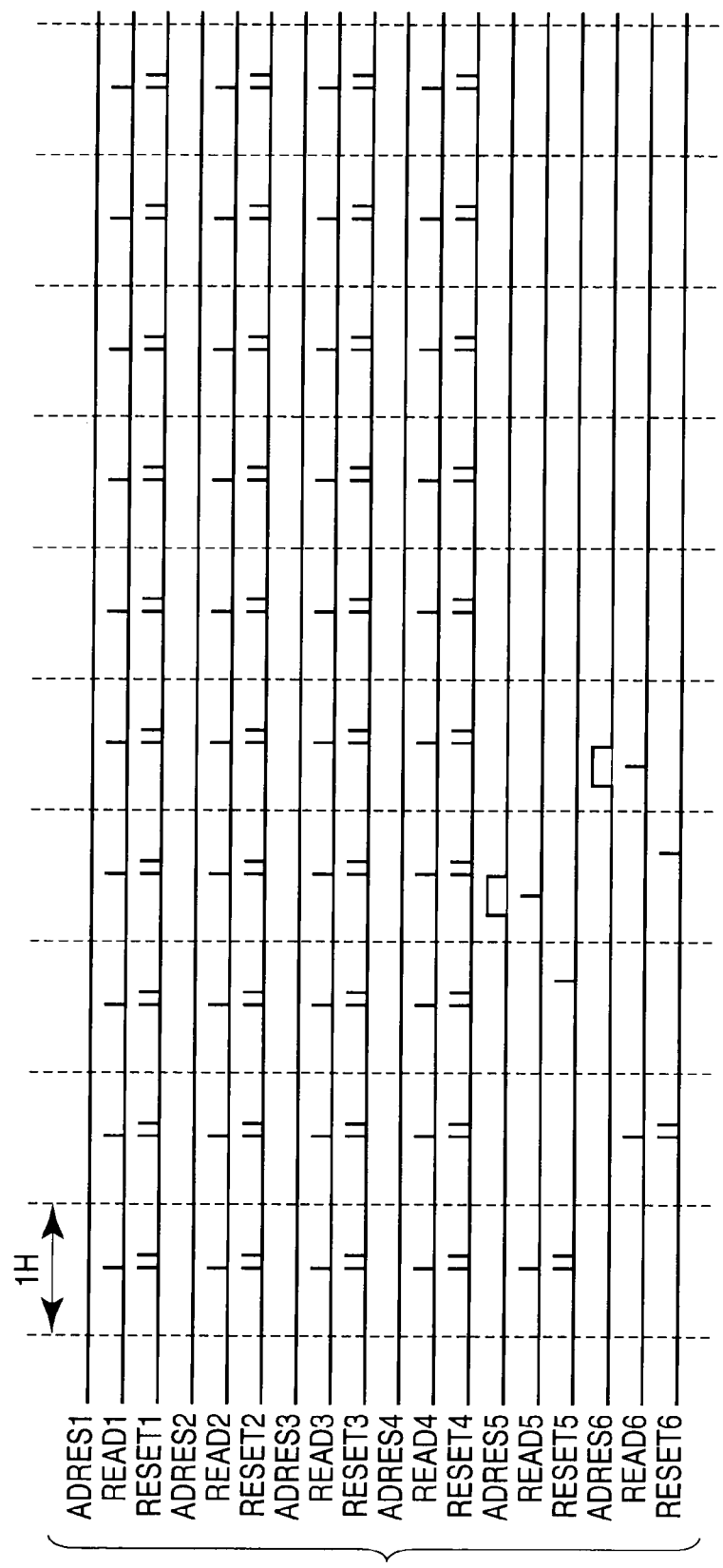

FIG. 15A, FIG. 15B and FIG. 15C show sensor operation timing at the cutting-out process time. In this example, a case wherein first, second, third and fourth rows are set as normally discharging rows is explained. Before the electronic shutter and reading operations, normally discharging rows are set. For setting the normally discharging rows, two clock signals DISCLK_OD and two clock signals DISCLK_EV are input in respective periods in which the data inputs DISDATA_OD and DISDATA_EV are high. As a result, the upper four rows on the screen are set as the normally discharging rows. By devising the pulse input method, not only the upper portion of the screen but also rows in the lower portion thereof or in a desired portion of the screen can be set as the normally discharging rows.

In the case of the embodiment 1, the reading process is performed starting from the first row (from the N-th row when the up/down inversion signal UDINV is "1"). On the other hand, in the embodiment 2, since the normally discharging rows are set, it is required to skip these rows. Therefore, as many extra clock signals ESACLK_OD, ESBCLK_OD, ROCLK_OD, ROCLK_EV as the number of normally discharging rows are input to skip reading for discharging rows. The same operation is performed in the reading process in the "sub-sampling" and "pixel averaging" operations.

[Advantage]

According to the design of this embodiment, the "cutting-out" desired rows (a desired cutting-out range) can be realized simply by adding the charge discharging shift register to the design of the embodiment 1.

In the embodiments 1, 2, the design example of the unit cell with the one-pixel/one-cell structure is explained. However, this invention is not limited to this case and, for example, the same function can be attained with the same circuit design in the unit cell with the two-pixel/one-cell structure or four-pixel/one-cell structure.

Further, in the embodiments 1, 2, the registers and selectors that configure the electronic shutter vertical shift register circuit A20, electronic shutter vertical shift register circuit B21 and reading vertical shift register circuit 22 can be replaced by registers with SCAN (DFF with MUX). That is, if the registers and selectors are separately configured in two cells (shift registers), it becomes necessary to provide interconnects to connect the cells. Therefore, resources for interconnects are consumed at the layout time and the circuit area increases. The resources used for interconnects can be reduced and the circuit scale can be prevented from being enlarged by using the registers with SCAN in which the functions of the register and selector are integrated. In most designing environment, since registers with SCAN can be used, the circuit scale can be reduced simply by replacing them by the registers with SCAN.

Further, this invention is not limited to the above embodiments and can be variously modified without departing from the scope thereof at the embodying stage. In addition, inventions at various stages are contained in the respective embodiments and various inventions can be extracted by adequately combining constituents disclosed therein. For example, when at least one of the problems described can be solved and at least one of the effects described can be attained even if several constituents are eliminated from all of the constituents disclosed in the embodiments, the design in obtained by eliminating the above constituents can be extracted as the invention.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A solid-state image sensing device comprising:
an image sensing region having pixels arranged in a two-dimensional array,
a vertical shift register circuit that selects a desired pixel row of the pixels by changing the number of one or more clock signals supplied and timing thereof in one horizontal period, and
a pulse selector circuit that supplies a drive pulse to the desired pixel row selected by the vertical shift register circuit, wherein
the vertical shift register circuit includes
first and second shift register circuits with the same circuit design that select a charge storage starting row of the pixels; and
a third shift register circuit that selects a charge reading row in the pixels, and
charges of pixels in one or more rows of a number corresponding to the number of one or more clock signals input in an enable period of a control signal supplied to the first or second shift register circuit at a charge storage start timing are sub-sampled.

2. The device according to claim 1, wherein charges of pixels in rows of a number corresponding to the number of one or more clock signals input in an enable period of a control signal supplied to the third shift register circuit at a charge reading start timing are averaged.

3. The device according to claim 1, wherein
the vertical shift register circuit further comprises a fourth shift register that selects a normally discharging row of the pixels, and
reading of charges of pixels in one or more rows of a number corresponding to the number of one or more clock signals input in an enable period of a control signal supplied to the fourth shift register circuit at a charge storage start timing and at a charge reading start timing is skipped.

4. A solid-state sensing device, comprising:
an image sensing region having pixels arranged in a two-dimensional array;
a vertical shift register circuit that selects a desired pixel row of the pixels by changing the number of one or more clock signals supplied and timing thereof in one horizontal period; and
a pulse selector circuit that supplies a drive pulse to the desired pixel row selected by the vertical shift register circuit, wherein
the vertical shift register circuit includes
first and second shift register circuits with the same circuit design that select a charge storage starting row of the pixels; and
a third shift register circuit that selects a charge reading row in the pixels, and
charges of pixels in rows of a number corresponding to the number of one or more clock signals input in an enable period of a control signal supplied to the third shift register circuit at a charge reading start timing are averaged.

5. A solid-state image sensing device comprising:
an image sensing region having pixels arranged in a two-dimensional array, the pixels configuring pixel rows;
a timing generator circuit that outputs one or more drive pulses to drive the pixels at common timing for each unit period and outputs one or more clock signals at common timing for each unit period, the timing generator circuit being configured to output the one or more clock signals of a variable number and timing in the unit period;
a vertical shift register circuit that outputs a row select signal to select one of pixel rows determined by the number and timing of the one or more clock signals; and
a pulse selector circuit that supplies the one or more drive pulses to the pixel row specified by the row select signal, wherein
the one or more drive pulses include a pixel discharging drive pulse and pixel reading drive pulse,
the one or more clock signals include a pixel discharging clock signal and a pixel reading clock signal,
the row select signal includes a discharging row select signal to supply the pixel discharging drive pulse to a specified pixel row, and a reading row select signal to supply the pixel reading drive pulse to a specified pixel row,
the vertical shift register circuit includes
a first shift register circuit that outputs discharging row select signals so that one of the pixel rows is sequentially selected each time the pixel discharging clock signal is received;
a second shift register circuit that has the same circuit design as the first shift register circuit, and outputs discharging row select signals so that one of the pixel rows is sequentially selected each time the pixel discharging clock signal is received; and
a third shift register circuit that outputs reading row select signals so that one of the pixel rows is sequentially selected each time the reading clock signal is received, and
the vertical shift register circuit is configured to output discharging row select signals to select different pixel rows in the same unit period.

6. The device according to claim 5, wherein
the first and second shift register circuits receive pixel discharging clock signals in an enable period to select pixel rows in the same unit period, and
the third shift register circuit outputs the reading row select signal to select one pixel row among the pixel rows selected in the same period.

7. The device according to claim 5, wherein
the first and second shift register circuits receive pixel discharging clock signals in an enable period to select pixel rows in the same unit period, and, the third shift register circuit outputs the reading row select signal to select all or two or more pixel rows among the pixel rows selected in the same period.

8. The device according to claim 5, wherein the vertical shift register circuit further comprises a fourth shift register that continuously outputs the discharging row select signal for one or more pixel rows previously selected among the pixel rows.

* * * * *